(12) United States Patent
Sasaki et al.

(10) Patent No.: US 9,588,284 B2
(45) Date of Patent: Mar. 7, 2017

(54) MULTI-CORE FIBER

(71) Applicants: FUJIKURA LTD., Tokyo (JP); NATIONAL UNIVERSITY CORPORATION HOKKAIDO UNIVERSITY, Sapporo-shi, Hokkaido (JP)

(72) Inventors: Yusuke Sasaki, Sakura (JP); Katsuhiro Takenaga, Sakura (JP); Yoshimichi Amma, Sakura (JP); Kunimasa Saitoh, Sapporo (JP)

(73) Assignees: FUJIKURA LTD., Tokyo (JP); NATIONAL UNIVERSITY CORPORATION HOKKAIDO UNIVERSITY, Sapporo-shi, Hokkaido (JP)

( * ) Notice: Subject to any disclaimer, the term of this patent is extended or adjusted under 35 U.S.C. 154(b) by 0 days.

(21) Appl. No.: 15/062,530

(22) Filed: Mar. 7, 2016

(65) Prior Publication Data

US 2016/0187576 A1    Jun. 30, 2016

Related U.S. Application Data

(63) Continuation of application No. PCT/JP2015/055947, filed on Feb. 27, 2015.

(30) Foreign Application Priority Data

Mar. 7, 2014    (JP) ................................ 2014-044912

(51) Int. Cl.
| | |
|---|---|
| *G02B 6/02* | (2006.01) |
| *G02B 6/028* | (2006.01) |
| *G02B 6/036* | (2006.01) |

(52) U.S. Cl.
CPC ....... *G02B 6/02042* (2013.01); *G02B 6/0288* (2013.01); *G02B 6/02219* (2013.01); *G02B 6/028* (2013.01); *G02B 6/036* (2013.01)

(58) Field of Classification Search
None
See application file for complete search history.

(56) References Cited

U.S. PATENT DOCUMENTS

| | | | | |
|---|---|---|---|---|
| 8,285,094 B2 * | 10/2012 | Takenaga | ........... | G02B 6/02042 385/100 |
| 8,406,595 B2 * | 3/2013 | Hayashi | ............. | G02B 6/02042 385/123 |

(Continued)

FOREIGN PATENT DOCUMENTS

| | | |
|---|---|---|
| JP | 2013-120243 A | 6/2013 |
| WO | 2012/161811 A1 | 11/2012 |

OTHER PUBLICATIONS

Sasaki et al., "Large-Effective-Area Two-mode Multi-core Fiber", IEICE 2012 (1 pages).

(Continued)

*Primary Examiner* — Rhonda Peace
(74) *Attorney, Agent, or Firm* — Westerman, Hattori, Daniels & Adrian, LLP

(57) ABSTRACT

In a C band and an L band, the effective refractive indices of light propagating through the cores 11 and 21 adjacent to each other are different from each other such that a magnitude of crosstalk of light of a highest-order LP mode commonly propagating through the cores 11 and 21 adjacent to each other between the cores 11 and 21 adjacent to each other becomes a peak at a bending diameter smaller than a diameter of 100 mm, and the core has a higher refractive index in a center portion than in an outer circumferential (Continued)

portion such that a differential mode group delay of the cores 11 and 12 is 700 picoseconds/km or less.

15 Claims, 15 Drawing Sheets

(56) References Cited

U.S. PATENT DOCUMENTS

| | | | | |
|---|---|---|---|---|
| 8,965,165 B2* | 2/2015 | Sasaki | | G02B 6/02042 385/126 |
| 9,008,479 B2* | 4/2015 | Tanigawa | | G02B 6/02042 385/126 |
| 9,081,129 B2* | 7/2015 | Matsuo | | G02B 6/02042 |
| 9,151,887 B2* | 10/2015 | Hoover | | G02B 6/02042 |
| 9,400,351 B2* | 7/2016 | Takenage | | G02B 6/02042 |
| 2014/0178024 A1* | 6/2014 | Takenaga | | G02B 6/02042 385/126 |
| 2016/0187576 A1* | 6/2016 | Sasaki | | G02B 6/0288 385/126 |

OTHER PUBLICATIONS

Awaji et al.,"Measurement and simulation of bending characteristics of homo- and hetero-geneous seven core fibers", IEICE Technical Report, vol. 111, No. 298 (5 pages).
Sasaki et al., "Large-effective-area uncoupled few-mode multi-core fiber", Optics Express, Dec. 10, 2012, vol. 20, No. 26, (8 pages).
International Search Report dated May 19, 2015 issued in counter part PCT application No. PCT/JP2015/055947.

* cited by examiner

REFRACTIVE INDEX

MULTI-CORE FIBER

TECHNICAL FIELD

The present invention relates to a multi-mode multi-core fiber and is very suitable for a case where the load of signal processing on the reception side of light is to be decreased.

BACKGROUND ART

Generally, an optical fiber used for an optical fiber communication system that is widely used has a structure in which the outer circumference of one core is surrounded by an outer cladding. As an optical signal propagates inside the core, information is transmitted. Recently, according to the wide use of optical fiber communication systems, the amount of transmitted information is rapidly increased.

In order to realize an increase in the transmission capacity of such an optical fiber communication system, it is known to transmit a plurality of signals using light propagating through each core by using a multi-core fiber in which the outer circumferences of a plurality of cores are surrounded by one outer cladding.

In addition, in order to realize an increase in the transmission capacity of the optical fiber communication system, a multi-mode communication has been known which performs information communication by superimposing information on light of an LP01 mode (basic mode) and superimposing information on light of each LP mode of a higher order than that of the basic mode such as an LP11 mode. In a case where such multi-mode communication is performed, a multi-mode optical fiber is used.

In Non Patent Literature 1 described below, a multi-mode multi-core fiber performing multi-mode communication using a multi-core fiber has been disclosed.

(Non Patent Literature 1) Y. Sasaki et al., "Large-effective-area uncoupled few-mode multi-core fiber", Opt. Express, 20 (26), pp. B77-B84 (2012).

SUMMARY OF INVENTION

According to the multi-mode multi-core fiber disclosed in Non Patent Literature 1, more information can be transmitted. However, it is known that, in a multi-core fiber, light between cores causes crosstalk. In addition, it is known that, when a multi-mode communication is performed using an optical fiber, a differential mode group delay (DMD) occurs. In a case where the crosstalk or the differential mode group delay is high, the process of MIMO (Multiple Input Multiple Output) or the like becomes complicated on the reception side. For this reason, also in the multi-mode multi-core fiber, it is desirable to decrease the load of signal processing on the reception side of light by decreasing the crosstalk and the differential mode group delay.

Thus, an object of the present invention is to provide a multi-mode multi-core fiber capable of decreasing the load of signal processing on the reception side of light.

To achieve the object described above, a multi-core fiber of the present invention includes at least: nine or more core elements each including a core that propagates light of at least up to a second-order LP mode in a C band and an L band, an inner cladding layer that surrounds an outer circumferential face of the core and has a refractive index lower than a refractive index of the core, and a trench layer that surrounds an outer circumferential face of the inner cladding layer and has a refractive index lower than the refractive index of the inner cladding layer; and an outer cladding that surrounds outer circumferential faces of the trench layers and has a refractive index higher than the refractive index of the trench layer and lower than the refractive index of the core, wherein effective refractive indices of light propagating through cores adjacent to each other are different from each other such that a magnitude of crosstalk of light of a highest-order LP mode commonly propagating through the cores adjacent to each other between the cores adjacent to each other becomes a peak at a bending diameter smaller than a diameter of 100 mm, and wherein the core has a higher refractive index in an area including a center axis than in an area disposed on an outer circumferential side such that a differential mode group delay of the core is 700 picoseconds/km or less.

According to such a multi-core fiber, crosstalk becomes a peak out of a bending range of the multi-core fiber that is practically used. In addition, crosstalk is lower in an area in which the bending diameter is larger than the bending diameter at which the crosstalk becomes the peak than in an area in which the bending diameter is smaller than the bending diameter at which the crosstalk becomes the peak. Accordingly, practically, the crosstalk can be suppressed. In addition, each differential core mode delay is 700 picoseconds/km or less. Accordingly, by performing optical communication using the multi-core fiber according to the present invention, signal processing can be simplified on the reception side of light.

In addition, an outer diameter of the outer cladding is preferably 125 μm or more and 230 μm or less. Since the outer cladding has such an outer diameter, long-term reliability is maintained in a multi-mode multi-core fiber that is used for a main line.

In addition, a difference between effective areas of light of a same LP mode propagating through the cores is preferably 20 μm² or less. Since a difference between diameters of light propagating through the cores is small, also in a case where light is extracted by connecting the same optical fiber to each core, a change in the connection loss for each core can be suppressed.

In addition, a bending loss of light of a highest-order LP mode of light having a longest wavelength propagating through each of the cores is preferably 0.5 dB or less in a case where the cores are rolled 100 turns with a diameter of 60 mm.

In addition, the magnitude of the crosstalk of the light of the highest-order LP mode commonly propagating through the cores adjacent to each other between the cores adjacent to each other is preferably −30 dB/100 km or less.

In addition, the core preferably includes an inner area that includes a center axis and an outer area that surrounds an outer circumferential face of the inner area without any gap and is surrounded by the inner cladding layer without any gap, and a refractive index of the inner area is preferably higher than a refractive index of the outer area. By configuring the refractive indices of such two levels, in the core, the area including the center axis has a refractive index higher than that of the area disposed on the outer circumferential side. By using such cores, a design for suppressing a differential mode group delay can be easily made.

Alternatively, the refractive index of the core preferably decreases from a center axis toward an outer circumferential side, and a change rate of the refractive index preferably increases toward the outer circumferential side. In this way, as the refractive index gradually changes, the area including the center axis has a refractive index higher than that of the area disposed on the outer circumferential side. Such a core is called a GI (Graded Index) type, and a design for suppressing a differential mode group delay can be easily made.

The cores may be arranged in an annular shape. In such a case, the number of the cores is preferably even, and the two types of the cores having mutually-different effective refractive indices of the propagating light are preferably arranged to be adjacent to each other.

Alternatively, the cores may be arranged in a square lattice shape. In such a case, the two types of the cores having mutually-different effective refractive indices of propagating light are preferably arranged to be adjacent to each other.

In addition, a wavelength band of light propagating through the cores may be a C band.

As above, according to the present invention, a multi-core fiber capable of decreasing the load of signal processing on the reception side of light is provided.

DESCRIPTION OF EMBODIMENTS

Hereinafter, multi-core fibers according to preferred embodiments of the present invention will be described in detail with reference to the drawings. For the convenience of understanding, a scale illustrated in each drawing and a scale presented in the following description may be different from each other.

First Embodiment

Figure 1A:
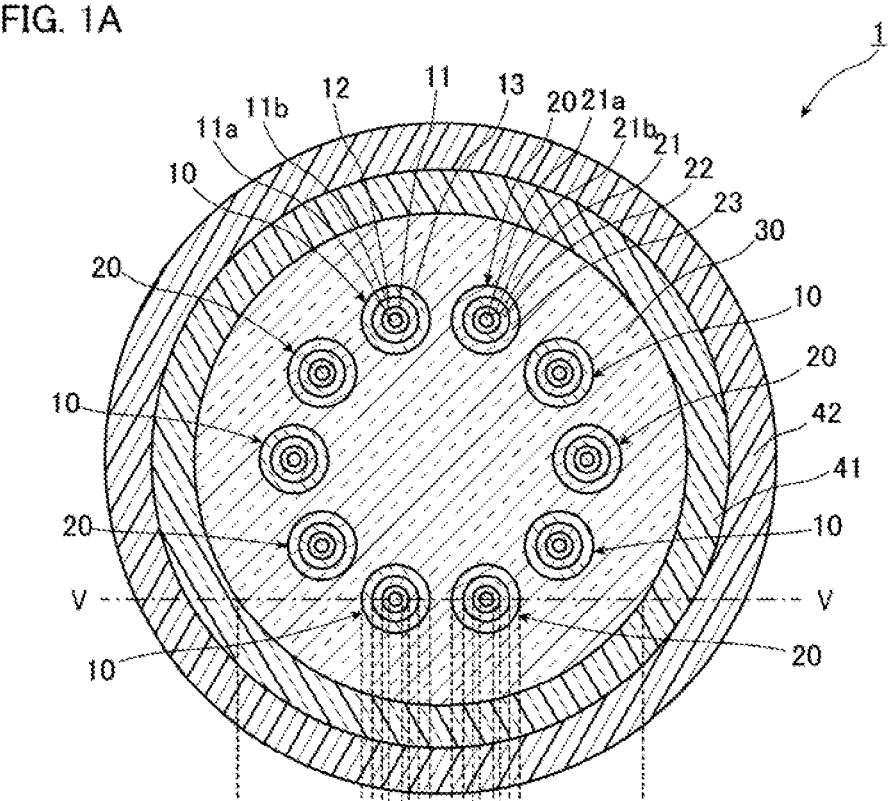
FIGS. 1A and 1B are diagrams that illustrate the appearance of a multi-core fiber according to a first embodiment of the present invention.
Figure 1B:
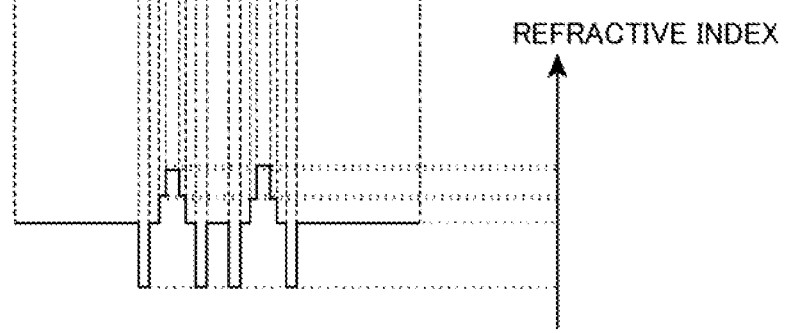

FIGS. 1A and 1B are diagrams that illustrate the appearance of a multi-core fiber according to a first embodiment of the present invention. More specifically, FIG. 1A is a diagram that illustrates the structure of a cross-section of the multi-core fiber that is perpendicular to the longitudinal direction thereof, and FIG. 1B is a diagram that schematically illustrates the appearance of a refractive index profile of the multi-core fiber 1 illustrated in FIG. 1A at line V-V.

As illustrated in FIG. 1A, the multi-core fiber 1 according to this embodiment includes: a plurality of core elements 10 and a plurality of core elements 20; an outer cladding 30 that surrounds the entirety of the core elements 10 and 20 and surrounds the outer circumferential faces of the core elements 10 and 20 without any gap by filling up spaces between the core elements 10 and the core elements 20; an inner protective layer 41 that covers the outer circumferential face of the outer cladding 30; and an outer protective layer 42 that covers the outer circumferential face of the inner protective layer 41. The number of the core elements is nine or more, and, this embodiment illustrates a case where a total number of the core elements 10 and the core elements 20 is 10.

Each of the core elements 10 that are first core elements includes: a core 11 that is a first core; an inner cladding layer 12 that surrounds the outer circumferential face of the core 11 without any gap; and a trench layer 13 that surrounds the outer circumferential face of the inner cladding layer 12 without any gap. The core 11 is configured using an inner area 11a and an outer area 11b that surrounds the inner area 11a without any gap. Each of the core elements 20 that are second core elements includes: a core 21 that is a second core; an inner cladding layer 22 that surrounds the outer circumferential face of the core 21 without any gap; and a trench layer 23 that surrounds the outer circumferential face of the inner cladding layer 22 without any gap. The core 21 is configured using an inner area 21a and an outer area 21b that surrounds the inner area 21a without any gap.

The core elements 10 and the core elements 20 are arranged in an annular shape such that each core element 10 and each core element 20 are adjacent to each other. In other words, in a case where the number of the core elements 10 and 20 is n, the core elements 10 and 20 are arranged in a regular polygon having n angles. For this reason, any core element is not arranged at the center of the outer cladding 30, and there is no core element surrounded by a plurality of the core elements 10 and 20. In addition, the core pitches (inter-center pitch) between the cores 11 of the core elements 10 and the cores 21 of the core elements 20 adjacent to each other are the same. Furthermore, the center of the regular polygon in which the core elements 10 and 20 are arranged coincides with the axis of the outer cladding 30.

The refractive index of each inner area 11a is configured to be higher than the refractive index of the outer area 11b. In this way, in the core 11, an area including the center axis is formed to have a refractive index higher than that of an area disposed on the outer circumferential side. The refractive index of the inner cladding layer 12 is lower than the refractive index of the outer area 11b. The refractive index of the trench layer 13 is lower than the refractive index of the inner cladding layer 12 and the refractive index of the outer cladding 30. In a case where each core element 10 is viewed from the viewpoint of the refractive index, since the trench layer 13 is lower than the inner cladding layer 12 and the outer cladding 30, each core element 10 has a trench structure. The refractive indices of the cores 11 of the core elements 10 are the same. For example, the refractive indices and the diameters of the inner areas 11a thereof are the same, the refractive indices and the outer diameters of the outer areas 11b thereof are the same, the refractive indices and the outer diameters of the inner cladding layers 12 thereof are the same, and the refractive indices and the outer diameters of the trench layers 13 thereof are the same.

The refractive index of the inner area 21a thereof is higher than the refractive index of the outer area 21b. In this way, in the core 21, the refractive index of the area including the center axis is higher than that of the area disposed on the outer circumferential side. The refractive index of the inner cladding layer 22 is lower than the refractive index of the outer area 21b. The refractive index of the trench layer 23 is lower than the refractive index of the inner cladding layer 22 and the refractive index of the outer cladding 30. Thus, in a case where each core element 20 is viewed from the viewpoint of the refractive index, the trench layer 23 is lower than the inner cladding layer 22 and the outer cladding 30, and accordingly, each core element 20, similar to the core element 10, has a trench structure. In addition, the cores 21 of the core elements 20 have the same refractive index. For example, the refractive indices and the diameters of the inner areas 21a thereof are the same, the refractive indices and the outer diameters of the outer areas 21b thereof are the same, the refractive indices and the outer diameters of the inner cladding layers 22 thereof are the same, and the refractive indices and the outer diameters of the trench layers 23 thereof are the same.

As above, by configuring the refractive indices of the trench layers 13 and 23 to be lower than the refractive indices of the inner cladding layers 12 and 22 and the refractive index of the outer cladding 30, a light confinement effect for confining light in the cores 11 and 21 increases, and accordingly, the leakage of light propagating through the cores 11 and 21 from the core elements 10 and 20 can be decreased. The outer cladding 30 surrounding the outer circumferential faces of the trench layers 13 and 23 and the trench layers 13 and 23 having a low refractive index without any gap serves as a barrier, and crosstalk between the core 11 and the core 21 that are adjacent to each other can be decreased.

Figure 2:
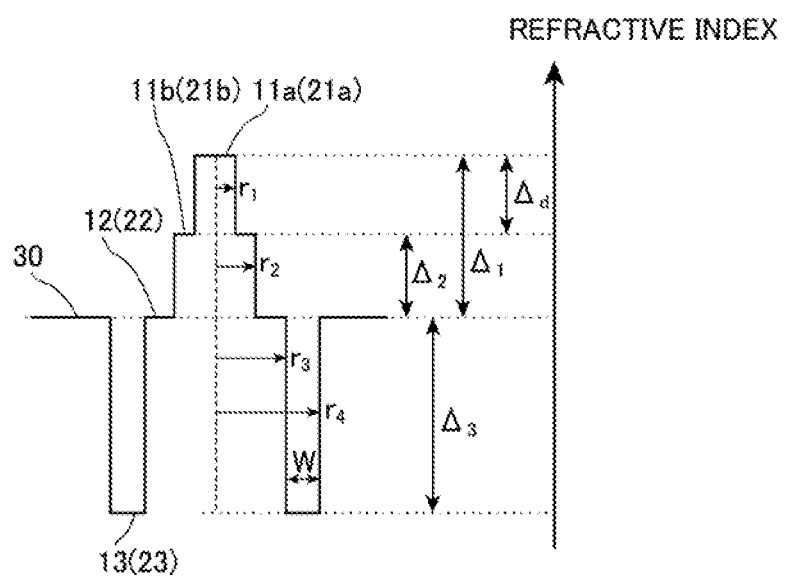
FIG. 2 is an enlarged diagram that illustrates the refractive index profile of each core element illustrated in FIGS. 1A and 1B.

FIG. 2 is an enlarged diagram that illustrates the refractive index profile of each core element illustrated in FIGS. 1A and 1B. For the convenience of illustration, similar reference signs are assigned to portions at which the refractive indices of the inner areas 11a and 21a, the outer areas 11b and 21b, the inner cladding layers 12 and 22, the trench layers 13 and 23, and the outer cladding 30 are illustrated. In FIG. 2, the configuration of the core element 20 is illustrated using parentheses. As illustrated in FIG. 2, in the core elements 10 and 20, a relative refractive index difference of each of the inner areas 11a and 21a with respect to the outer cladding 30 is $\Delta_1$, a relative refractive index difference of each of the outer areas 11b and 21b with respect to the outer cladding 30 is $\Delta_2$, the refractive indices of the inner cladding layers 12 and 22 and the refractive index of the outer cladding 30 are the same, a relative refractive index difference of each of the trench layers 13 and 23 with respect to the outer cladding 30 is $\Delta_3$, and a difference between $\Delta_1$ and $\Delta_2$ is $\Delta_d$. In addition, the radius of each of the inner areas 11a and 21a is $r_1$, the radius of the outer circumference of each of the outer areas 11b and 21b is $r_2$, the radius of the outer circumference of each of the inner cladding layers 12 and 22 is $r_3$, the radius of the outer circumference of each of the trench layers 13 and 23 is $r_4$, and the width of each of the trench layers 13 and 23 is W.

The core 11 of the core element 10 and the core 21 of the core element 20 have mutually-different refractive indices. In other words, in the multi-core fiber 1, two types of cores 11 and 21 of which the effect refractive indices of light propagating therethrough are different from each other are alternately arranged. As above, in order to configure the effective refractive index (the effective refractive index of the core 11 for light propagating through the core 11) of light propagating through the core 11 and the effective refractive index (the effective refractive index of the core 11 for light propagating through the core 21) of light propagating through the core 21, which are adjacent to each other, to be different from each other, parameters of configurations of the core elements adjacent to each other are configured to be in mutually-different states. For example, the size of each configuration of the core element 10 and the size of each configuration of the core element 20 are configured to be the same, and, as illustrated in FIG. 1B, the refractive index of a specific configuration of the core element 10 and the refractive index of a specific configuration of the core element 20 are configured to be different from each other. FIG. 1B illustrates a case where the inner area 11a and the outer area 11b of the core element 10 and the inner area 21a and the outer area 21b of the core element 20 have mutually-different refractive indices. Thus, in FIG. 2, while the refractive index profile states of the inner areas 11a and 21a, the outer areas 11b and 21b, the inner cladding layers 12 and 22, the trench layers 13 and 23, and the outer cladding 30 are illustrated as one diagram for the convenience of description, it does not represent that the refractive index profiles of the core element 10 and the core element 20 coincide with each other.

In case of such a multi-core fiber 1, for example, light of an LP01 mode and light of an LP11 mode propagate therethrough, and thus, the spatial multiplexing number becomes 2 modes×10 cores=multiplexing of 20. In addition, light of the LP11 mode is light (light of an LP11a mode and light of an LP11b mode) of two LP11 modes of which energy distributions are different from each other by 90 degrees on a cross-section perpendicular to the longitudinal direction of the cores, and accordingly, the light of the LP11 mode is formed by light of the two modes. In such a case, the spatial multiplexing number of the multi-core fiber 1 becomes 3 modes also including light of the LP01 mode×10 cores=multiplexing of 30.

In this embodiment, each of the cores 11 and 21 propagates light of up to second-order LP mode. In order for each of the cores 11 and 21 to propagate light up to the second-order LP mode, for example, at a wavelength of 1530 nm, a bending loss of light of the LP21 mode at a bending diameter of 280 mm may be 1 dB/m or more, and a bending loss of light of the LP11 mode at a wavelength of 1625 nm may be 0.5 dB/100 turn or less at a bending diameter of 60 mm.

In this embodiment, as illustrated in FIGS. 1B and 2, while the refractive indices of the inner cladding layers 12 and 22 are equal to the refractive index of the outer cladding 30, the refractive indices of the inner cladding layers 12 and 22 may be set between the refractive index of the outer cladding 30 and the refractive indices of the outer areas 11b and 21b. Alternatively, the refractive indices of the inner cladding layers 12 and 22 may be set to be lower than the refractive index of the outer cladding 30. Relative refractive index differences of the inner cladding layers 12 and 22 with respect to the outer cladding 30 are timely set to a positive/negative value for the adjustment of a wavelength dispersion characteristic.

In FIGS. 1B and 2, the refractive indices of the inner protective layer 41 and the outer protective layer 42 are not illustrated.

However, in a case where the effective refractive index of light propagating through the core is low, the cutoff wavelength of light decreases, and the bending loss increases. The bending loss being large has the same meaning as the force of the core confining light being weak, which leads to the degradation of crosstalk. However, the multi-core fiber 1 of this embodiment has a force of confining light in the cores 11 and 21 stronger than that of a case where no trench layer is present by using the trench layers 13 and 23. By increasing the thickness of each of the trench layers 13 and 23, the force confining light can be stronger. However, in a case where the force confining light is too high, the cutoff wavelength rather increases. Generally, light of an LP mode of a higher order than that of light of a highest-order LP mode that is originally used for optical communication degrades the communication quality and is not desirable to be propagated. Thus, in order to increase the communication band, it is necessary to make such an adjustment that the cutoff wavelength is not long. The thickness of each of the trench layers 13 and 23 is determined in consideration of the degradation of the crosstalk and the increase in the cutoff wavelength.

In addition, in a case where a distance from each of the cores 11 and 21 to the inner protective layer 41 is short, there are cases where a part of light propagating through the cores 11 and 21 is absorbed by the inner protective layer 41. Thus, it is preferable that each of the cores 11 and 21 is a predetermined distance or more apart from the outer circumferential face of the outer cladding 30. However, in a case where a distance between each of the cores 11 and 21 and the outer circumferential face of the outer cladding 30 is too long, the diameter of the multi-core fiber 1 becomes long. The longer the wavelength of the light propagating through the core is, the larger the effective area $A_{eff}$ becomes. In case of light having a same wavelength, the effective area $A_{eff}$ differs according to the LP mode. Thus, the distance from each of the cores 11 and 21 to the outer circumferential face of the outer cladding 30 may be determined such that the loss of light of the LP mode, for which the effective area $A_{eff}$ is the largest, is less than a predetermined value for light having the largest wavelength included in a used wavelength band.

The loss can be acquired through a calculation using a finite element method or the like. For example, in a case where light up to the second-order LP mode is propagated in a C+L band of which the wavelength band is 1530 nm to 1625 nm, the effective area $A_{eff}$ of light of the LP11 mode is the largest at a wavelength of 1625 nm. Thus, in a case where it is assumed that the cores 11 and 21 are cores having a refractive index profile of a step type in which the refractive index is uniform, a relative refractive index difference of each of the cores 11 and 21 with respect to the outer cladding 30 is 0.45%, and the core radius thereof is 6.47 μm, when calculated using the finite element method, the distance from each of the cores 11 and 21 to the outer circumferential face of the outer cladding 30 is 48 μm, and the loss at a bending radius of 140 mm is 0.001 dB/km or less. Thus, under such conditions, when the distance from each of the cores 11 and 21 to the outer circumferential face of the outer cladding 30 is 48 μm, there is no problem. As above, the distance between the core and the outer circumferential face of the outer cladding may be determined based on the used wavelength, the mode of light to be propagated, the relative refractive index difference of the core with respect to the outer cladding, and the like. In order to arrange nine or more core elements with the distance between the cores and the outer circumferential face of the outer cladding maintained and maintain long-term reliability in a case where the multi-core fiber is used as a main line, the outer diameter of the outer cladding 30 is preferably 125 μm or more and 230 μm or less.

Next, the effective refractive index $\Delta n_{eff}$ of light propagating through each of the cores 11 and 21 will be described.

In a multi-core fiber, crosstalk between cores depends on the bending diameter of the multi-core fiber, and, at a specific bending radius, the crosstalk is worst. Like this embodiment, in case of a multi-mode multi-core fiber, the crosstalk is degraded the most between light of a highest-order LP mode of propagating light. Accordingly, when the crosstalk of light of the highest-order LP mode becomes a peak in an area of a bending diameter, for which the multi-core fiber is not generally used, the worst crosstalk can be avoided. Meanwhile, in a case where the optical fiber is bent with a small bending diameter, the probability of breakage raises, and the loss of light propagating through the core according to the bending increases. For this reason, a minimum bending diameter considered for a high-capacity transmission optical fiber like this embodiment is a diameter of 100 mm. The crosstalk is better in a case where the bending diameter is larger than the bending diameter at which the worst crosstalk is formed than in a case where the bending diameter is smaller than the bending diameter at which the worst crosstalk is formed. Accordingly, in a case where the bending diameter $R_{PK}$ at which the crosstalk of light of the highest-order LP mode becomes a peak is smaller than a bending diameter of 100 mm, under the environment of a normal use of the optical fiber, the crosstalk is considered to be sufficiently suppressed.

Here, in a case where the effective refractive index of light of the LP mode propagating one of the cores 11 and 21 adjacent to each other is denoted by $n_{eff}$, an core pitch between the cores 11 and 21 adjacent to each other is denoted by D, and an effective refractive index difference between light of the highest-order LP mode and light of the highest-order LP mode respectively propagating through the cores 11 and 21 adjacent to each other is denoted by $\Delta n_{eff}$, the bending radius $R_{PK}$ at which the crosstalk of the light is worst can be represented in the following Equation (1).

$$R_{PK} = n_{eff} D / \Delta n_{eff} \tag{1}$$

Based on Equation (1), it can be understood that, as $\Delta n_{eff}$ increases, $R_{PK}$ decreases. As above, by configuring $R_{PK}$ to be 100 mm or less, the crosstalk can be sufficiently suppressed. For this, in a case where $n_{eff}$ is in the range of 1.444 to 1.447, and D is in the range of 40 to 50 μm, $\Delta n_{eff}$ may be 0.0007 or more.

Next, the differential mode group delay of light will be described.

When light of mutually-different modes is propagated through one core, a differential mode group delay (DMD) occurs. For example, in a core having a refractive index profile of a step type in which the refractive index is uniform, between light of the LP01 mode and light of the LP11 mode, a differential mode group delay of 3n s/km occurs. However, the cores 11 and 21 of the multi-core fiber 1 according to this embodiment are cores having refractive indices of two levels in which the refractive indices of the inner areas 11a and 21a are higher than the refractive indices of the outer areas 11b and 21b. Such cores 11 and 21 can suppress the differential mode group delay more than a core having a refractive index profile of the step type in which the refractive index is uniform. For example, in a case where a relative refractive index difference $\Delta_d$ of the inner areas 11a and 21a with respect to the outer areas 11b and 21b increases, the differential mode group delay decreases. As described above, the cores 11 and 21 according to this embodiment propagate light of up to the second-order LP mode. A differential mode group delay of light propagated through the core 11 and light propagated through the core 21 is 700 picoseconds/km or less. In such a range of the differential mode group delay, also in a case where a MIMO process is performed on the reception side, the load of the process can be low.

In this way, according to the multi-core fiber 1 of this embodiment, the crosstalk becomes a peak out of the range of the bending radius (a diameter of 100 mm) of a multi-core fiber that is practically used. In addition, as described above, the crosstalk is lower in an area of a bending diameter larger than the bending diameter at which the crosstalk becomes a peak than in an area of a bending diameter smaller than the bending diameter at which the crosstalk becomes the peak. Accordingly, the crosstalk can be suppressed in a practical use. In addition, each differential core mode delay is 700 picoseconds/km or less. Thus, by performing optical communication using the multi-core fiber 1, the load of the signal processing on the reception side of light can be decreased.

Second Embodiment

Next, a second embodiment of the present invention will be described. A same reference numeral is assigned to a constituent element that is the same as or equivalent to that of the first embodiment, and duplicate description thereof will not be presented except for a case where it is particularly described.

Figure 3:
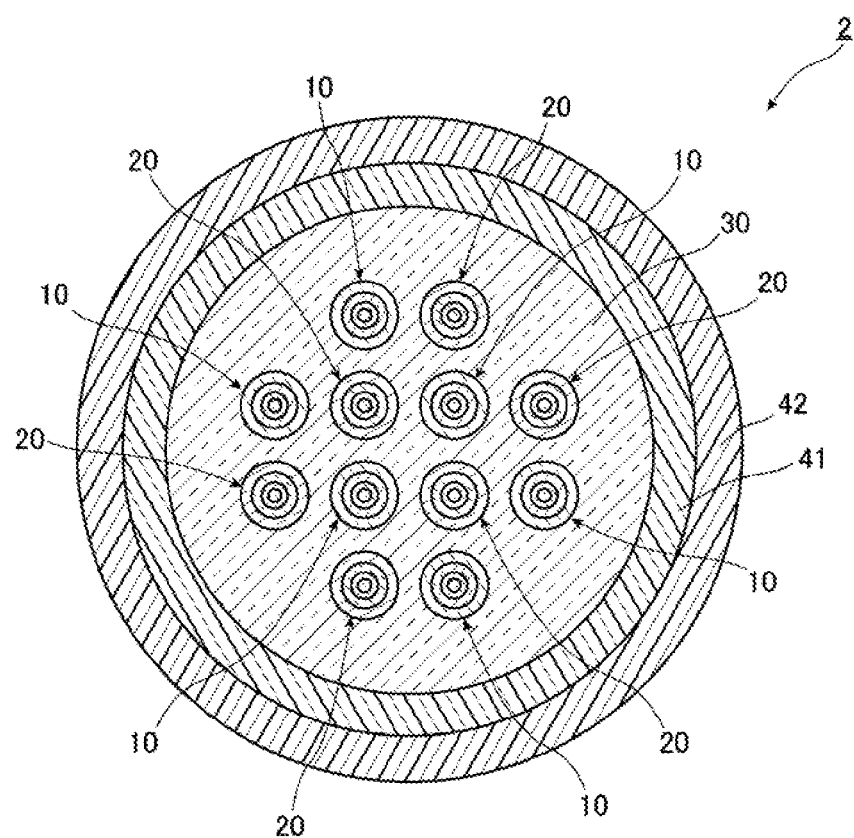
FIG. 3 is a diagram that illustrates the appearance of a multi-core fiber according to a second embodiment of the present invention.

FIG. 3 is a diagram that illustrates the appearance of a multi-core fiber according to this embodiment. As illustrated in FIG. 3, in the multi-core fiber 2 according to this embodiment, six core elements 10 and six core elements 20 are disposed to be adjacent to each other so as to be arranged in a square lattice shape. In other words, 12 core elements are arranged, and the cores thereof are arranged on the lattice points of a predetermined tetragonal lattice, which has a square shape, located at the center of a cladding and on the lattice points of a tetragonal lattice adjacent to the predetermined tetragonal lattice. In case of such a multi-core fiber 2, for example, light of an LP01 mode and light of an LP11 mode propagate therethrough, and accordingly, the spatial multiplexing number is 2 modes×12 cores=multiplexing of 24. In addition, the light of the LP11 mode is formed by light (light of an LP11a mode and light of an LP11b mode) of two LP11 modes of which the energy distributions are different from each other by 90 degrees on a cross-section perpendicular to the longitudinal direction of the cores, and accordingly, the light of the LP11 mode is formed by light of two modes. In this case, the spatial multiplexing number of the multi-core fiber 2 is three modes including also the light of the LP01 mode×12 cores=multiplexing of 36.

Also in such a multi-core fiber 2, the configuration of each of the core elements 10 and 20, an core pitch, and a distance from a core located on the outermost side to the outer circumferential face of the outer cladding 30 are similar to those of the multi-core fiber 1. In this way, also in a case where the core elements 10 and 20 are arranged, the effective refractive indices of light propagating through the cores 11 and 21 are different from each other. Accordingly, the multi-core fiber 2 according to this embodiment is similar to the multi-core fiber 1 according to the first embodiment, the crosstalk becomes a peak out of the range of the bending radius (a diameter of 100 mm) of a multi-core fiber that is practically used, and each differential core mode delay is 700 picoseconds/km or less. Accordingly, by performing optical communication using the multi-core fiber 2, the load of signal processing on the reception side of light can be decreased.

According to the multi-core fiber 2 of this embodiment, more cores can be arranged.

As above, while the embodiments of the present invention have been described as examples, the present invention is not limited thereto.

For example, while ten core elements are arranged inside the outer cladding 30 in the multi-core fiber 1 according to the first embodiment, and 12 core elements are arranged inside the outer cladding 30 in the multi-core fiber 2 according to the second embodiment, in a case where the refractive indices of the cores 11 and 21 adjacent to each other are different from each other, and the number of core elements is nine or more, more core elements may be arranged.

Figure 4:
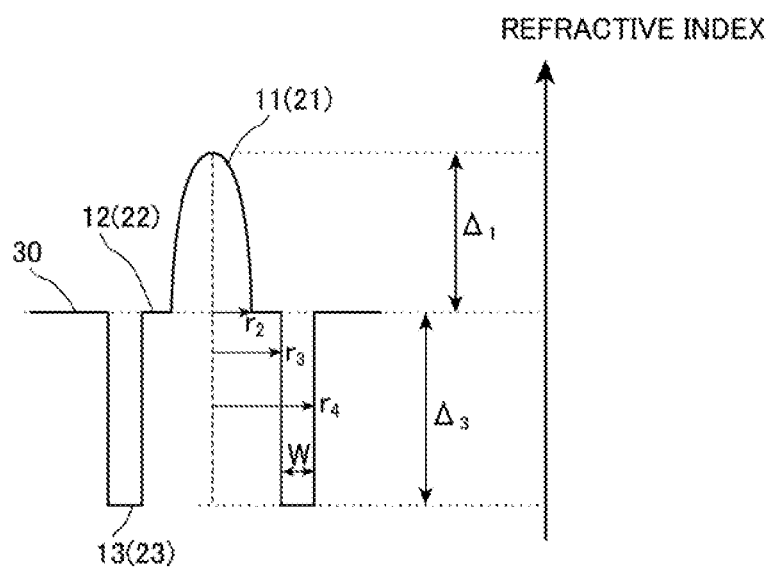
FIG. 4 is a diagram that illustrates another example of the refractive index profile of each core element.

In addition, in the embodiments described above, while the cores 11 and 21 are respectively formed by the inner areas 11a and 21a and the outer areas 11b and 21b, the present invention is not limited thereto. Here, another example of the core elements will be described. A same reference numeral is assigned to a constituent element that is the same as or equivalent to that of the first embodiment, and duplicate description will not be presented except for a case of particular description. FIG. 4 is a diagram that illustrates another example of the core elements 10 and 20 that can be used for the embodiments described above using a method similar to that illustrated in FIG. 2. In FIG. 4, the configuration of the core element 20 is illustrated in parentheses. As illustrated in FIG. 4, the cores 11 and 21 of this example have a refractive index decreasing from the center axis toward the outer circumferential side, and the rate of change in the refractive index is higher toward the outer circumferential side. In this way, in the cores 11 and 21, an area including the center axis has a refractive index higher than that of an area disposed on the outer circumferential area. A core having such a refractive index profile is called a GI (Graded Index) type and can be easily designed for the suppression of the differential mode group delay. Except for the difference of the cores 11 and 21, the other configurations are similar to those of the core elements 10 and 20 according to the first embodiment. Accordingly, also in this example, the effective refractive index of light propagating through the core 11 and the effective refractive index of light propagating through the core 21 are different from each other. A relative refractive index difference at the center portion of each of the cores 11 and 21 is $\Delta_1$, and the radius of each of the cores 11 and 21 is equivalent to the radius (the radius of the outer circumference of each of the outer areas 11b and 21b) of each of the cores 11 and 21 according to the first embodiment so as to be $r_2$. Also in this drawing, while the refractive index profile states of the core elements 10 and 20 are illustrated as one diagram for the convenience of the illustration, it does not represent that the refractive index profiles of the core elements 10 and 20 coincide with each other.

In the embodiments described above, while each of the cores 11 and 21 has been described to propagate light of up to the second-order LP mode, each of the cores may propagate light of the LP mode of the third or higher order, and each of the cores 11 and 21 may perform multi-mode optical communication.

In addition, in the embodiments described above, while the multi-core fiber including the two types of the core elements 10 and 20 of which the effective refractive indices of light propagating through the cores are different from each other has been described as an example, the present invention is not limited thereto but may be a multi-core fiber including three types of core elements of which the effective refractive indices of light propagating through the cores are different from each other.

EXAMPLE

Hereinafter, while examples of the present invention will be described more specifically, the present invention is not limited to the following examples.

Example 1

The multi-core fiber 2 illustrated in FIG. 3 having a length of 40 km is produced. In this multi-core fiber 2, the use wavelength is set to 1530 nm to 1625 nm, and light of the LP01 mode and light of the LP11 mode are respectively propagated through the cores 11 and 21. In all the cores 11 and 21, the magnitude of the differential mode group delay is configured to be 700 picoseconds/km or less, and, in a case where the cores 11 and 21 propagate the same light, the crosstalk of light of the LP11 mode between cores adjacent to each other satisfies −30 dB/100 km. In addition, the outer diameter of the outer cladding 30 is formed to be 230 μm.

<Design of Multi-Core Fiber>

Before the production of the multi-core fiber 2, the design is made through a calculation. As illustrated in FIG. 2, a relative refractive index difference of each of the inner areas 11a and 21a with respect to the outer cladding 30 is configured to be $\Delta_1$, a relative refractive index difference of each of the outer areas 11b and 21b with respect to the outer cladding 30 is configured to be $\Delta_2$, the refractive index of each of the inner cladding layers 12 and 22 and the refractive index of the outer cladding 30 are configured to be the same, a relative refractive index difference of each of the trench layers 13 and 23 with respect to the outer cladding 30 is configured to be $\Delta_3$, and a difference between $\Delta_1$ and $\Delta_2$ is configured to be $\Delta_d$. In addition, the radius of each of the inner areas 11a and 21a is configured to be $r_1$, the radius of the outer circumference of each of the outer areas 11b and 21b is configured to be $r_2$, the radius of the outer circumference of each of the inner cladding layers 12 and 22 is configured to be $r_3$, the radius of the outer circumference of each of the trench layers 13 and 23 is configured to be $r_4$, and the width of each of the trench layers 13 and 23 is configured to be W.

In this example, in a range in which the 22 m cutoff wavelength is 1450 nm or less and a bending loss at a diameter of 60 mm and 100 turns is 0.5 dB or less at a wavelength of 1625 nm, in a case where the effective refractive index of light of the LP11 mode is configured to be higher in the core 11 than in the core 21, the design can be made as parameters illustrated in the following Table 1. Since the bending loss increases as $\Delta_2$ decreases, the lower limit of $\Delta_2$ is determined. In addition, since the cutoff wavelength increases as $\Delta_2$ increases, the upper limit of $\Delta_2$ is determined. Accordingly, an optimal $\Delta_2$ is determined as below. In addition, $\Delta_1$ is determined as described below.

TABLE 1

|  | Core11 | Core21 |
|---|---|---|
| $r_2$ [μm] | 7.3 | 7.1 |
| $r_2/r_3$ | 1.8 | 1.8 |
| $W/r_3$ | ≤0.60 | ≤0.71 |
| $\Delta_1$ [%] | $\Delta_2 + \Delta_d$ | $\Delta_2 + \Delta_d$ |

TABLE 1-continued

|  | Core11 | Core21 |
|---|---|---|
| $\Delta_2$ [%] | 0.35 | 0.33 |
| $\Delta_3$ [%] | −0.7 | −0.7 |

Figure 5:
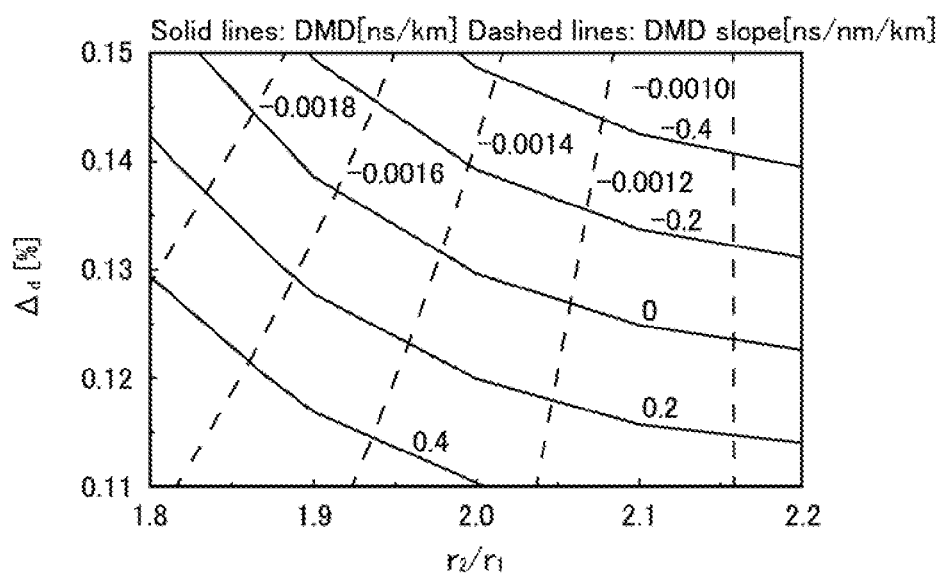
FIG. 5 is a diagram that illustrates a differential mode group delay of a first core at a wavelength of 1580 nm and the dependency of the differential mode group delay on the wavelength.
Figure 6:
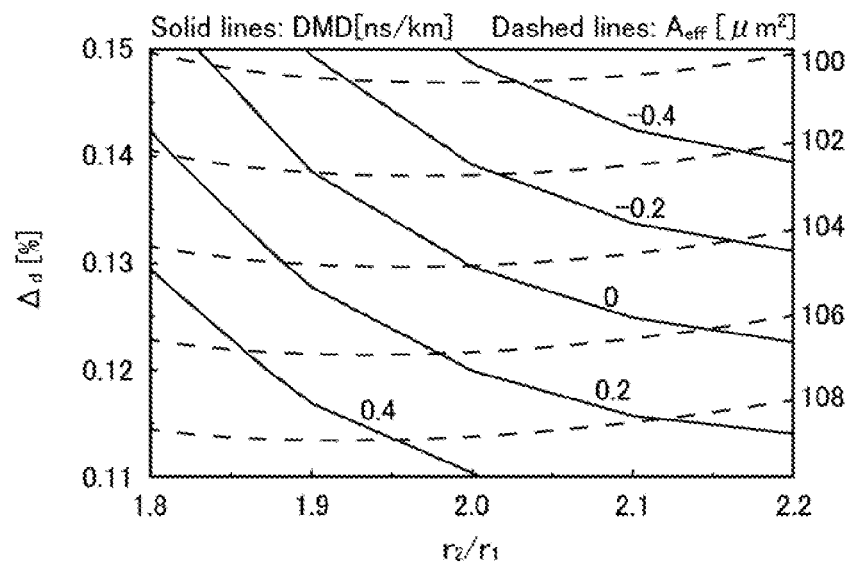
FIG. 6 is a diagram that illustrates the dependency of an effective area $A_{eff}$ of light of an LP11 mode propagating through the first core on $\Delta d$ and $r_2/r_1$.
Figure 7:
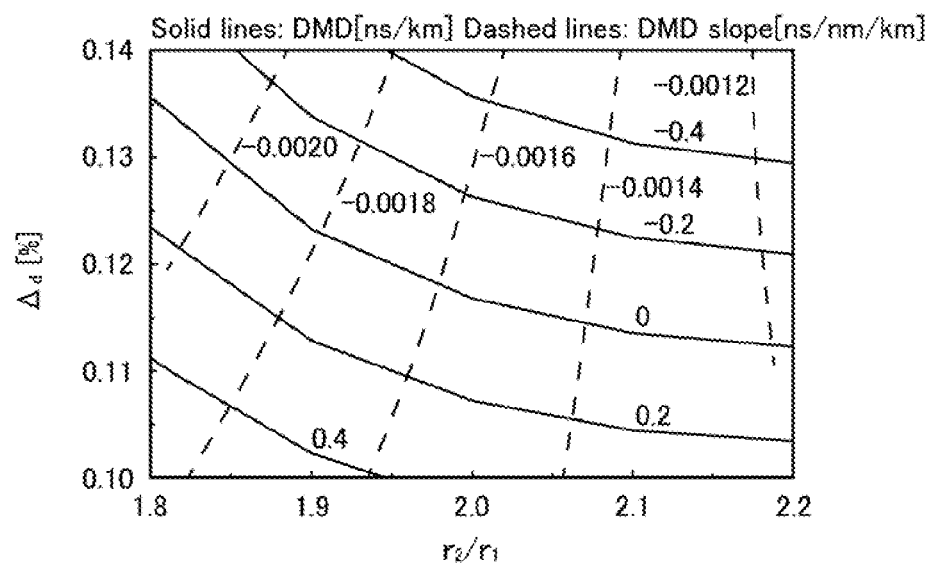
FIG. 7 is a diagram that illustrates the differential mode group delay of a second core at a wavelength of 1580 nm and the dependency of the differential mode group delay on the wavelength.
Figure 8:
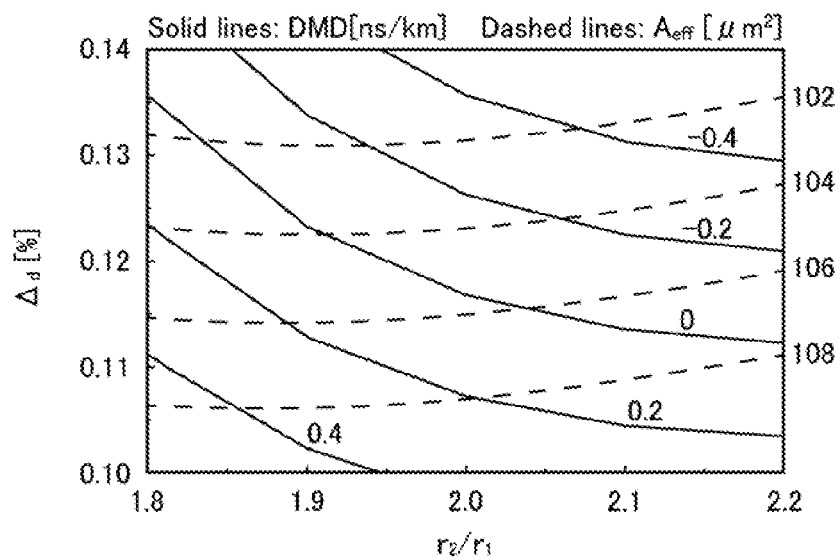
FIG. 8 is a diagram that illustrates the dependency of an effective area $A_{eff}$ of light of the LP11 mode propagating through the second core on $\Delta_d$ and $r_2/r_1$.

By using the parameters illustrated in Table 1, a differential mode group delay (DMD) of the core 11, which is the first core, at a wavelength of 1580 and the wavelength dependency (DMD slope) of the differential mode group delay are illustrated in FIG. 5. In addition, under this condition, the dependency of the effective area $A_{eff}$ of light of the LP11 mode propagating through the core 11 on $\Delta_d$ and on $r_2/r_1$ is illustrated in FIG. 6. Similarly, by using the parameters illustrated in Table 1, a differential mode group delay (DMD) of the core 21, which is the second core, at a wavelength of 1580 and the wavelength dependency (DMD slope) of the differential mode group delay are illustrated in FIG. 7. In addition, under this condition, the dependency of the effective area $A_{eff}$ of light of the LP11 mode propagating through the core 21 on $\Delta_d$ and on $r_2/r_1$ is illustrated in FIG. 8.

Based on FIGS. 5 to 8, under the conditions illustrated in Table 1, in the cores 11 and 21, it has been understood that the magnitude of the differential mode group delay can be suppressed to be 700 picoseconds/km or less. In addition, based on FIGS. 6 and 8, it has been understood that the effective area $A_{eff}$ of light propagating through each of the cores 11 and 21 can be formed to be about 100 μm². From a viewpoint of suppressing the occurrence of a nonlinear optical effect due to an excessive high power density of light, the effective area $A_{eff}$ is preferably 90 μm² or more. It has been understood that, under the conditions illustrated in Table 1, the cores 11 and 21 can be connected to a general optical fiber with a connection loss suppressed and suppress the nonlinear optical effect.

Figure 9:
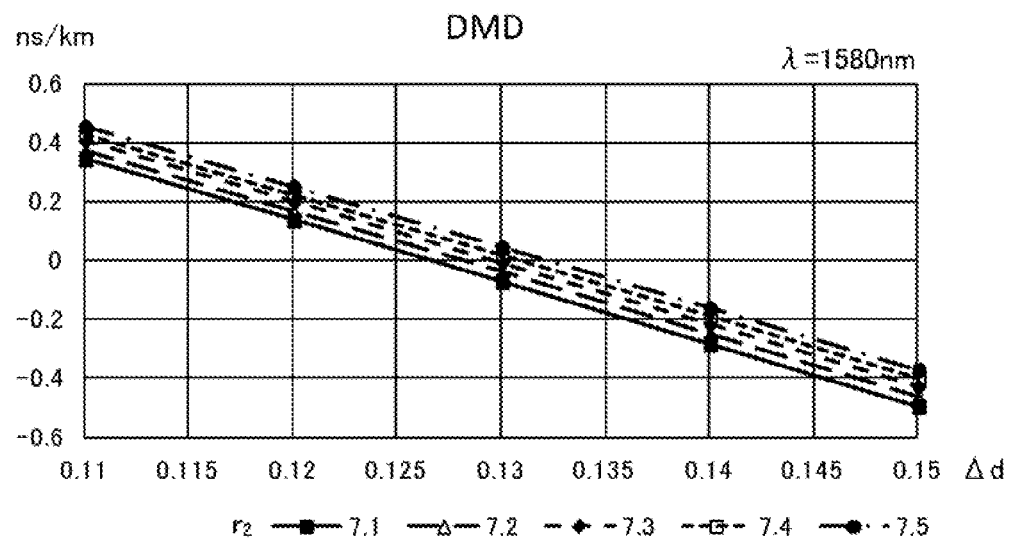
FIG. 9 is a diagram that illustrates the dependency of a differential mode group delay of light at a wavelength of 1580 nm on $\Delta_d$.

Here, by configuring $\Delta_d$ to be 0.11 to 0.15 by changing $\Delta_1$, the dependency of a differential mode group delay of light having a wavelength of 1580 nm on $\Delta_d$ was calculated. In addition, the dependency of a case where $r_2$ is changed to 7.1 to 7.5 was calculated. Results thereof are illustrated in FIG. 9. Based on FIG. 9, it has been understood that the differential mode group delay can be configured to zero by changing $\Delta_d$. Accordingly, it has been understood that, by arranging a difference between the refractive index of each of the inner areas 11a and 21a and the refractive index of each of the outer areas 11b and 21b, the differential mode group delay can be decreased, and the load of the signal processing on the reception side can be decreased.

Figure 10:
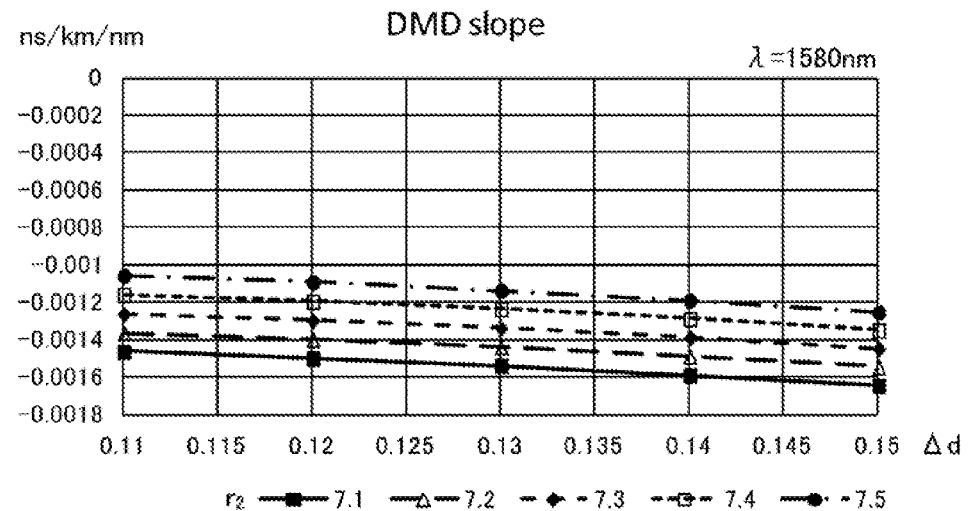
FIG. 10 is a diagram that illustrates the dependency of the wavelength dependency of a differential mode group delay on $\Delta_d$ for light having a wavelength of 1580 nm.

Thus, under the same condition, the wavelength dependency of the differential mode group delay was also calculated. A result thereof is illustrated in FIG. 10. Based on FIG. 10, it has been understood that the wavelength dependency of the differential mode group delay increases as $\Delta_d$ increases. Accordingly, it has been disclosed that, in a case where a difference between the refractive index of each of the inner areas 11a and 21a and the refractive index of each of the outer areas 11b and 21b is large, the wavelength dependency of the differential mode group delay is low, and a change in the differential mode group delay is small also in a case where the band of the used wavelength is wide, and accordingly, optical communication can be easily performed in a wide wavelength band.

Figure 11:
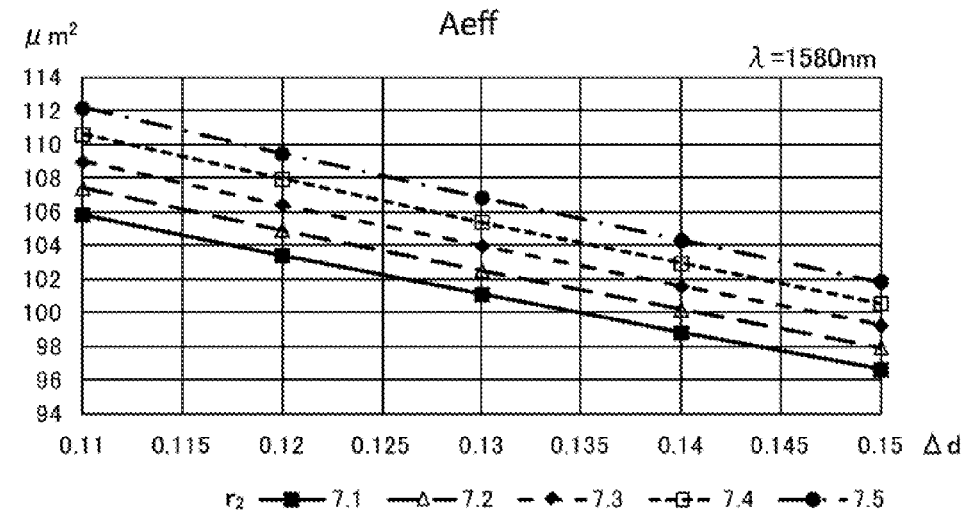
FIG. 11 is a diagram that illustrates the dependency of the wavelength dependency of an effective area on $\Delta_d$ for light having a wavelength of 1580 nm.

Next, under the same conditions, the effective area $A_{eff}$ was calculated as well. A result thereof is illustrated in FIG. 11. Based on FIG. 11, it has been understood that the $A_{eff}$ increases as $\Delta_d$ decreases. Thus, it has been understood that, in a case where a difference between the refractive index of each of the inner areas 11a and 21a and the refractive index of each of the outer areas 11b and 21b is small, the energy density of light can be suppressed from being too high, and the occurrence of a nonlinear optical effect can be suppressed.

As above, it has been disclosed that, based on the magnitude of the differential mode group delay and the balance between the wavelength dependency of the differential mode group delay and the effective area $A_{eff}$, $\Delta_d$ may be set to about two. Thus, $\Delta_d$ of the core 11 is set to 0.138%, $r_2/r_1$ thereof is set to 1.9, and $W/r_2$ thereof is set to 0.60, and $\Delta_d$ of the core 21 is set to 0.114%, $r_2/r_1$ thereof is set to 2.1, and $W/r_2$ thereof is set to 0.71. The crosstalk between the cores 11 and 21 that are adjacent to each other in a case where light of the LP11 mode having a wavelength of 1625 nm is 100 km propagated is illustrated in FIG. 12.

Figure 12:
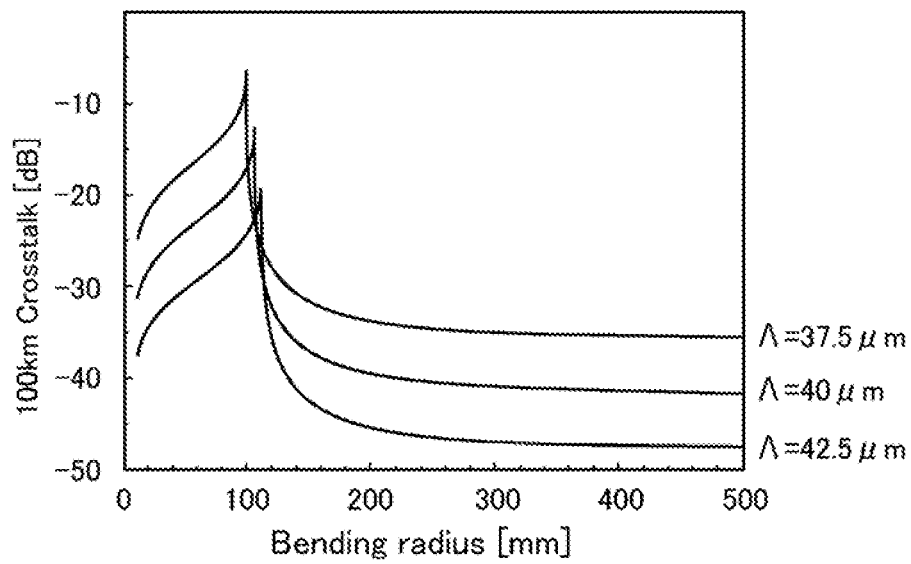
FIG. 12 is a diagram that illustrates crosstalk between cores adjacent to each other in a case where light of the LP11 mode having a wavelength of 1625 nm propagates by 100 km.

Based on FIG. 12, it has been understood that Rpm is 100 mm or less. In addition, based on this result, it has been understood that, in a case where an core pitch is about 40 μm, by adjusting the bending diameter, the crosstalk of all the cores 11 and 21 can be configured to be −40 dB/100 km. In addition, based on the result illustrated in FIG. 12, in a case where light is uniformly incident to all the cores 11 and 21, also when there are six cores that are closest to each other the most, it is considered that the crosstalk can be configured to be −30 dB/100 km.

<Production of Multi-Core Fiber>

Based on Table 2 and the values of $\Delta_d$, $r_2/r_1$, and $W/r_2$ described above, a multi-core fiber 2, which is illustrated in FIG. 3, having a length of 40.4 km was produced. The outer diameter of the outer cladding 30, the outer diameter of the outer protective layer 42, and the core pitch of this multi-core fiber 2 are as illustrated in the following Table 2.

TABLE 2

| Outer Cladding Diameter [μm] | Maximum | 229.8 |
|---|---|---|
| | Minimum | 229.1 |
| Outer Protective Layer Diameter [μm] | — | 341.1 |
| Core Pitch [μm] | Average | 41.0 |
| | Maximum | 41.4 |
| | Minimum | 40.5 |
| | Standard Deviation | 0.21 |

Next, the propagation loss of light of the produced multi-core fiber 2, a mode field diameter (MFD), an effective area ($A_{eff}$), a 22 m cutoff wavelength, a wavelength dispersion (the wavelength dependency of the differential mode group delay), a polarization mode dispersion coefficient (PMD coefficient), and a polarization dependency loss (PDL) were measured. Results thereof are illustrated in Table 3. In addition, the optical characteristics thereof were measured for light of modes illustrated in Table 3. Here, the value of the effective area of light of the LP11 mode is a result of a calculation using the finite element method.

TABLE 3

| | Mode | Wavelength [μm] | Average | Maximum | Minimum |
|---|---|---|---|---|---|
| Propagation Loss [dB/km] | LP01 | 1550 | 0.205 | 0.208 | 0.200 |
| | | 1625 | 0.210 | 0.213 | 0.206 |
| | LP11 | 1550 | 0.204 | 0.211 | 0.198 |
| | | 1625 | 0.211 | 0.217 | 0.206 |

TABLE 3-continued

| | Mode | Wavelength [μm] | Average | Maximum | Minimum |
|---|---|---|---|---|---|
| MFD [μm] | LP01 | 1550 | 11.0 | 11.5 | 10.8 |
| | | 1625 | 11.3 | 11.8 | 11.2 |
| $A_{eff}$ [μm$^2$] | LP01 | 1550 | 96.4 | 104.0 | 91.5 |
| | | 1625 | 101.4 | 110.2 | 97.4 |
| | LP11 | 1550 | 140.8 | 147.0 | 136.9 |
| | | 1625 | 148.1 | 154.8 | 145.7 |
| 22 m Cutoff Wavelength [μm] | LP21 | — | 1.47 | 1.51 | 1.44 |
| Wavelength Dispersion [ps/nm/km] | LP01 | 1550 | 19.5 | 19.8 | 19.3 |
| | | 1625 | 24.3 | 24.5 | 24.0 |
| PMD Coefficient [ps/√km] | LP01 | 1530~1625 | 0.07 | 0.11 | 0.03 |
| PDL [dB] | LP01 | 1530~1625 | 0.28 | 0.53 | 0.10 |

Based on Table 3, also in a core, for which the cutoff wavelength of light of the LP21 mode considered to have a largest bending loss is shortest, at a bending radius of a diameter of 30 mm, a bending loss of a case where light of the LP11 mode having a wavelength of 1625 nm is propagated was 0.14 dB/m. For such a bending loss, optical communication at the C+L band can be performed without any problem using light of the LP11 mode.

Next, for the produced multi-core fiber 2, differential mode group delays were measured for light of a wavelength of 1530 nm, 1550 nm, and 1608 nm. Results thereof are illustrated in Table 4. Among cores A to L illustrated in Table 4, cores C, F, I, and L represent the cores 11 and 21 of the core elements 10 and 20 located on the inner circumferential side illustrated in FIG. 3, and cores A, B, D, E, G, H, J, and K represent the cores 11 and 21 of the core elements 10 and 20 located on the outer circumferential side.

TABLE 4

| | Wavelength[μm] | | |
|---|---|---|---|
| | 1530 | 1550 | 1608 |
| Core A | −176 | −124 | −14 |
| Core B | −521 | −519 | −521 |
| Core C | 217 | 165 | 43 |
| Core D | −274 | −284 | −300 |
| Core E | −207 | −258 | −396 |
| Core F | −468 | −468 | −455 |
| Core G | −84 | −68 | −11 |
| Core H | −262 | −258 | −254 |
| Core I | 37 | 36 | 41 |
| Core J | −508 | −499 | −488 |
| Core K | 34 | −13 | −158 |
| Core L | −140 | −145 | −151 |

Based on Table 4, for all the cores of the produced multi-core fiber 2, a result of allowing a differential mode group delay at each wavelength to be less than 700 picoseconds/km is acquired.

Next, the crosstalk of the produced multi-core fiber 2 was measured. More specifically, light of the LP11 mode is propagated through each core of the multi-core fiber 2 having a length of 40.4 km by using a mode multiplexer/demultiplexer, and the crosstalk of light of the LP11 mode between two cores adjacent to each other was measured. The crosstalk was measured for light having each of wavelengths of 1530 nm, 1550 nm, and 1608 nm, and the multi-core fiber 2 was in a state being bent with a diameter of 310 mm at the time of the measurement. Then, the measured result was converted using an electric power combining theory from the crosstalk of 40.4 km into crosstalk of a case where light is 100 km propagated. As described above, since the cores C, F, I, and L are cores that are located on the inner circumferential side, each of the cores is adjacent to four cores. In addition, as described above, since the cores A, B, D, E, G, H, J, and K are cores that are located on the outer circumferential side, each of the cores is adjacent to two cores. In consideration of this point, by using the crosstalk in case of 100 km propagation that is acquired using the electric power combining theory from the measurement result described above, crosstalk of a case where light of the LP11 mode is 100 km propagated simultaneously through all the cores was calculated. A result thereof is illustrated in Table 5.

TABLE 5

| | Wavelength[μm] | | |
|---|---|---|---|
| | 1530 | 1550 | 1608 |
| Core A | −61.2 | −62.0 | −61.1 |
| Core B | −60.8 | −62.4 | −60.1 |
| Core C | −59.0 | −58.8 | −57.6 |
| Core D | −61.1 | −61.1 | −60.7 |
| Core E | −62.0 | −61.8 | −61.6 |
| Core F | −60.8 | −60.7 | −59.3 |
| Core G | −63.3 | −63.0 | −61.0 |
| Core H | −65.3 | −64.1 | −61.4 |
| Core I | −64.4 | −63.8 | −62.0 |
| Core J | −63.3 | −63.2 | −63.1 |
| Core K | −61.4 | −61.1 | −60.4 |
| Core L | −60.0 | −59.2 | −58.8 |
| Average | −62.3 | −62.0 | −60.8 |
| Maximum | −59.0 | −58.8 | −57.6 |
| Minimum | −65.3 | −64.1 | −63.1 |

Based on Table 5, a result of the achievement of low crosstalk of −50 dB/100 km or less is acquired in all the cores.

Example 2

While the cores according to Example 1 have refractive index profiles of two levels formed by the inner areas 11a and 21a and the outer areas 11b and 21b illustrated in FIG. 2, in this example, by configuring the cores of the multi-core fiber 2 illustrated in FIG. 2 as cores of the GI type illustrated in FIG. 4, the refractive indices of the cores 11 and 21 adjacent to each other are changed, and a multi-core fiber 2, of which an outer diameter of an outer cladding is 230 μm, having a length of 5 km was produced. For this multi-core fiber, a measurement was made similar to Example 1. As a result, crosstalk of a case where light of the LP11 mode was 100 km propagated through all the cores was −35 dB/100 km or less on the average. The magnitudes of the differential mode group delays were 100 picoseconds/km or less in all the cores.

Example 3

Cores 11 and 21 similar to those of Example 1 are applied to the multi-core fiber 1 illustrated in FIGS. 1A and 1B, and a multi-core fiber 1, of which the outer diameter of an outer cladding 30 is 225 μm, having a length of 7 km was produced. In this multi-core fiber, similar to Example 1, crosstalk of a case where light of the LP11 mode was 100 km propagated through the cores was −50 dB/100 km or less on the average. In addition, in all the cores, the magnitude of the differential mode group delay was 700 picoseconds/km or less.

Example 4

In the multi-core fiber 2 illustrated in FIG. 3, a multi-core fiber, in which each core element has a refractive index profile illustrated in FIG. 4, having a length of 40 km is produced. In this multi-core fiber 2, light having a use wavelength similar to that of Example 1 and an LP mode similar to that of Example 1 is propagated through the cores 11 and 21. Then, the crosstalk of light of the LP11 mode between cores adjacent to each other is configured to satisfy −30 dB/100 km in a case where the cores 11 and 21 propagate the same light. In the multi-core fiber 2 produced in this example, the magnitudes of the differential mode group delays in all the cores 11 and 21 are configured to be 100 picoseconds/km or less on the whole. In addition, the outer diameter of the outer cladding 30 is configured to be similar to that of Example 1.

<Design of Multi-Core Fiber>

Before the production of the multi-core fiber 2, the design thereof is made through a calculation. As illustrated in FIG. 4, the refractive index profile of each of the cores 11 and 21 is an a-th power distribution. In addition, as illustrated in FIG. 4, the radius of the cores 11 and 21 is configured to be $r_2$, and the relative refractive index difference at the center of each of the cores 11 and 21 with respect to the outer cladding 30 is configured to be $\Delta_1$. Furthermore, similar to Example 1, the refractive index of each of the inner cladding layers 12 and 22 and the refractive index of the outer cladding 30 are configured to be the same, a relative refractive index difference of each of the trench layers 13 and 23 with respect to the outer cladding 30 is configured to be $\Delta_3$, the radius of each of the outer circumferences of the inner cladding layers 12 and 22 is configured to be $r_3$, the radius of the outer circumference of each of the trench layers 13 and 23 is configured to be $r_4$, and the width of each of the trench layers 13 and 23 is configured to be W.

Figure 13:
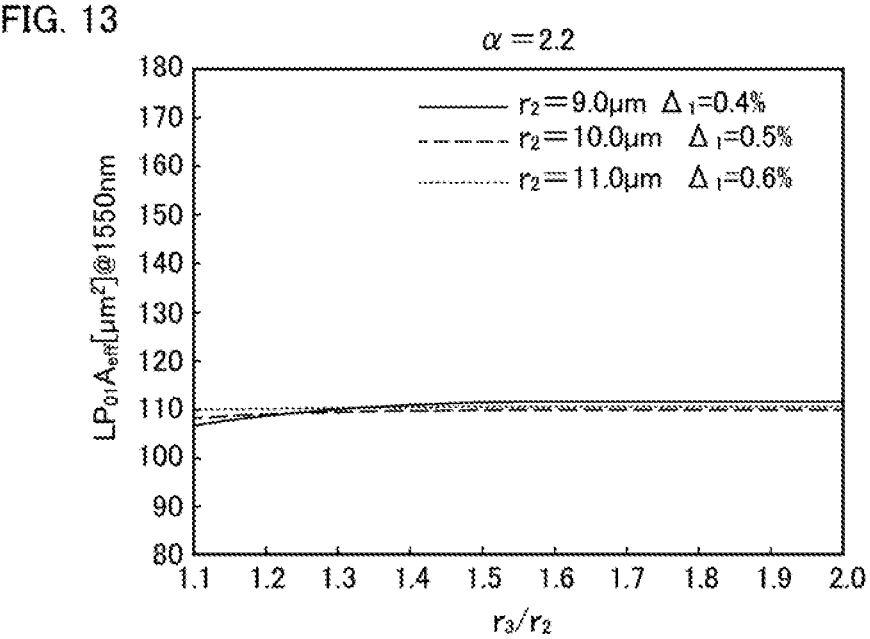
FIG. 13 is a diagram that illustrates the dependency of the effective area $A_{eff}$ on $r_3/r_2$ in a case where $\alpha$ is 2.2.
Figure 14:
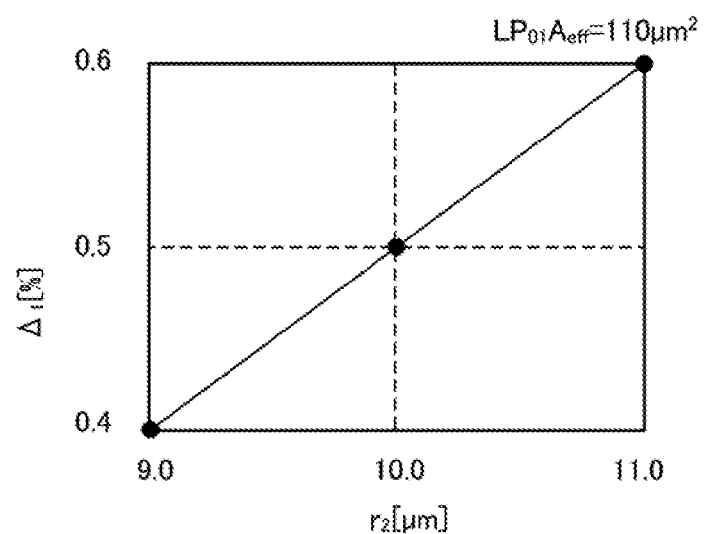
FIG. 14 is a diagram that illustrates a relation between $r_2$ and $\Delta_1$ in a case where the effective area $A_{eff}$ is configured such that the effective area $A_{eff}$ at a wavelength of 1550 nm is 110 μm².

FIG. 13 is a diagram that illustrates the dependency of the effective area $A_{eff}$ on $r_3/r_2$ in a case where $r_2$ and $\Delta_1$ illustrated in FIG. 4 are changed in a case where α is 2.2. As illustrated in FIG. 13, for light of the LP01 mode having a wavelength of 1550 nm, it has been disclosed that there is hardly dependency of the effective area $A_{eff}$ on $r_3/r_2$. In addition, FIG. 14 is a diagram that illustrates a relation between $r_2$ and $\Delta_1$ illustrated in FIG. 4 in a case where the effective area $A_{eff}$ is configured to be constant at a wavelength of 1550 nm. As illustrated in FIG. 14, in a case where the effective area $A_{eff}$ is constant, $\Delta_1$ is proportional to $r_2$. Based on FIG. 13 and FIG. 14, it is illustrated that $r_2$ can be changed in a predetermined range while $\Delta_1/r_2$ is maintained to be constant on the whole. The tendency illustrated in FIG. 13 and FIG. 14 is considered to be similar also in a case other than the case where a is 2.2 and is considered to be similar also for light of a different wavelength or the LP11 mode.

Next, the differential mode group delay (DMD) and dependency of the wavelength dependency (DMD slope) of the differential mode group delay on $r_3/r_2$ in a case where α is changed will be reviewed.

Figure 15:
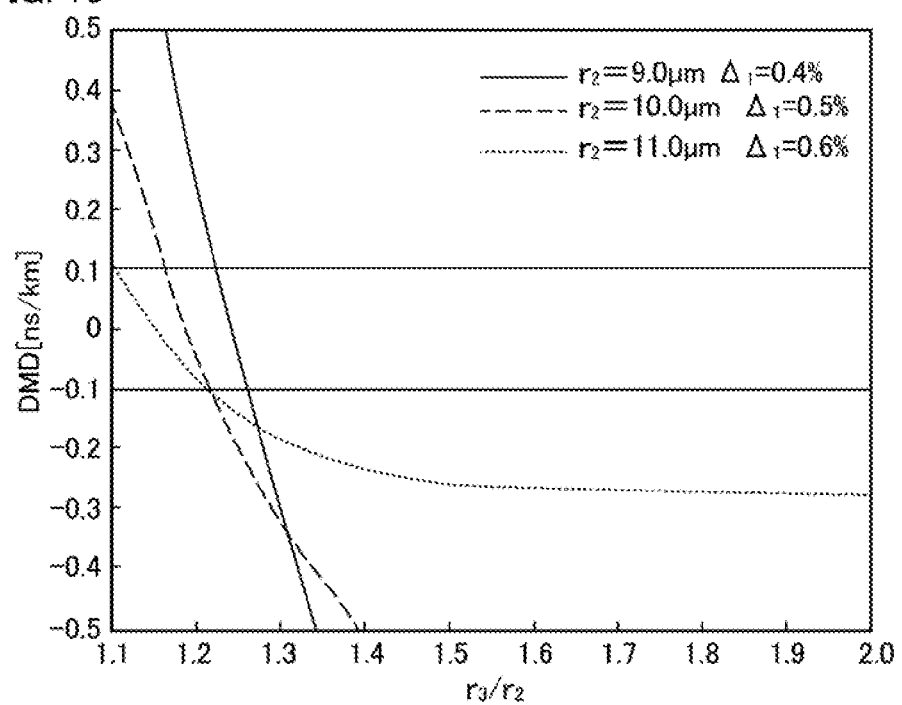
FIG. 15 is a diagram that illustrates the dependency of a DMD at which the effective area $A_{eff}$ at a wavelength of 1550 nm is 110 μm² on $r_3/r_2$ in a case where $\alpha$ is 2.0.

FIG. 15 is a diagram that illustrates the dependency of a DMD at which the effective area $A_{eff}$ for a wavelength of 1550 nm is 110 μm² on $r_3/r_2$ in a case where α is 2.0. In FIG. 15, a solid line represents the dependency of the DMD slope at r=9.0 μm and $\Delta_1$=0.4% on $r_3/r_2$, a dashed line represents the dependency of the DMD slope at $r_2$=10.0 μm and $\Delta_1$=0.5% on $r_3/r_2$, and a dotted line represents the dependency of the DMD slope at $r_2$=11.0 μm and $\Delta_1$=0.6% on $r_3/r_2$. In a case where $\Delta_1$ is lower than 0.4%, the bending loss of light of the LP11 mode increases, and it is difficult for the light to propagate, and, in a case where $\Delta_1$ is higher than 0.5%, the cutoff wavelength $\lambda_c$ of the LP21 mode tends to fall into the C band. Accordingly, $\Delta_1$ is configured to be 0.4% or more and 0.5% or less. For this reason, the dotted line in FIG. 15 is reference data. As illustrated in FIG. 15, in a case where the DMD is −100 picoseconds/km or more and 100 picoseconds/km or less, the range of $r_3/r_2$ of the solid line is 1.22 or more and 1.26 or less on the whole, and the range of $r_3/r_2$ of the dashed line is 1.15 or more and 1.22 or less on the whole. Thus, an area sandwiched by a line at which the DMD is −100 picoseconds/km, a line at which the DMD is 100 picoseconds/km, the solid line, and the dashed line is present, and $r_2$ can be set inside this area. Accordingly, it can be understood that, by configuring the radiuses $r_2$ of the cores 11 and 21 of the core elements 10 and 20 adjacent to each other illustrated in FIG. 3 to have mutually-different values, the DMD of each of the cores 11 and 21 can be within the range described above.

Figure 16:
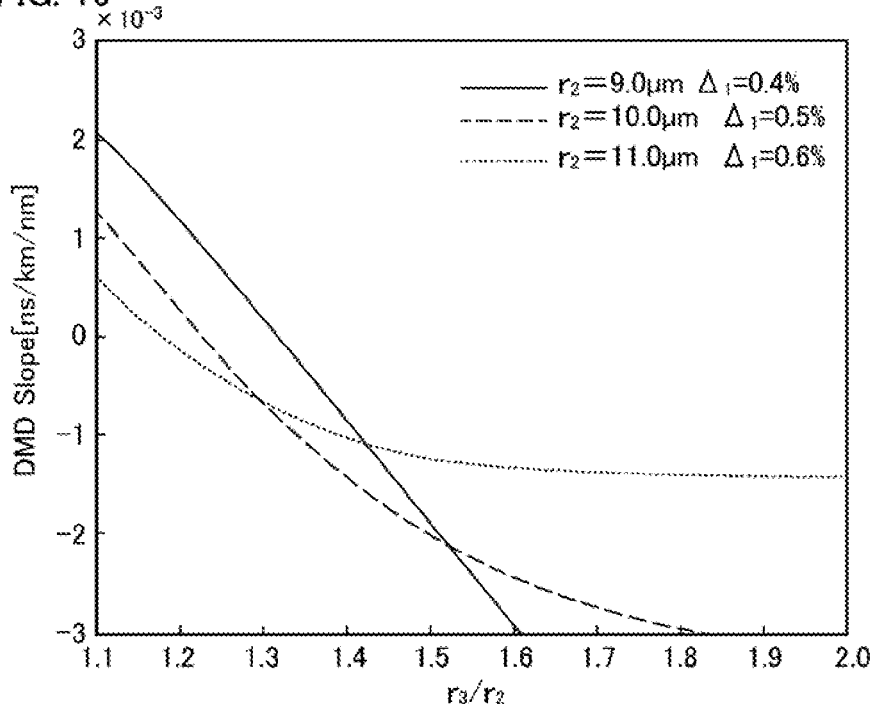
FIG. 16 is a diagram that illustrates the dependency of a DMD slope at a wavelength of 1550 nm on $r_3/r_2$ in a case where $\alpha$ is the same value as that illustrated in FIG. 15.

FIG. 16 is a diagram that illustrates the dependency of a DMD slope for a wavelength of 1550 nm on $r_3/r_2$ in a case where α has the same value as that illustrated in FIG. 15. In FIG. 16, a solid line, a dashed line, and a dotted line illustrate the states of $r_2$ and $\Delta_1$ similar to those illustrated in FIG. 15. It can be understood that, in the range of the solid lines of a case where the DMD illustrated in FIG. 15 is −100 picoseconds/km or more and 100 picoseconds/km or less and $r_3/r_2$ of the dashed line, also in FIG. 16, an area sandwiched by the solid line and the dashed line is present, and the DMD slope is 0.1 picoseconds/km/nm or more and 1 picoseconds/km/nm or less on the whole in the area. Accordingly, it can be understood that, in the area in which the DMD is −100 picoseconds/km or more and 100 picoseconds/km or less, in a case where the radiuses $r_2$ of the cores 11 and 21 are configured to have mutually-different values, the DMD slope has a good value.

Figure 17:
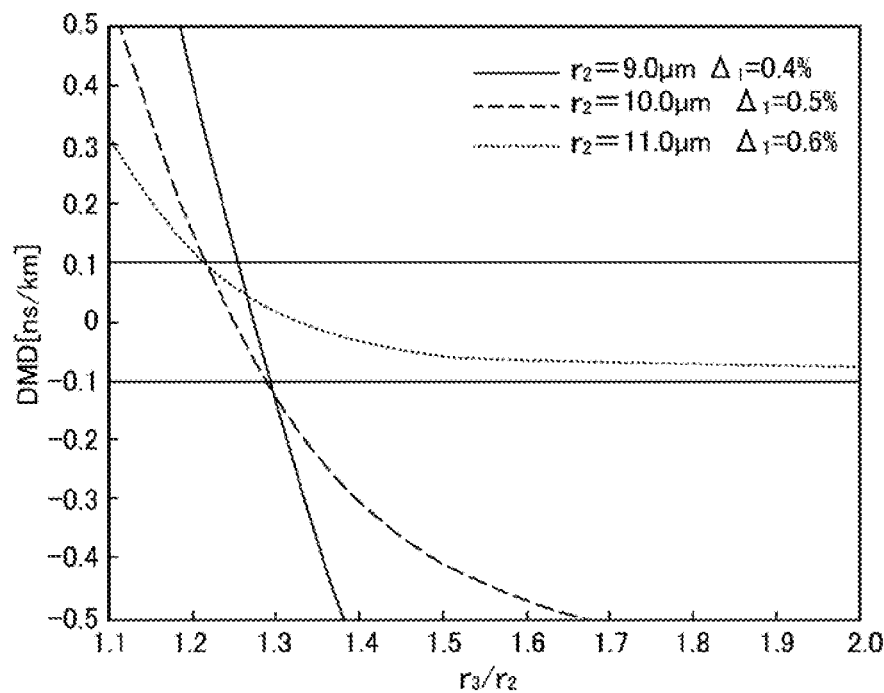
FIG. 17 is a diagram that illustrates the dependency of a DMD at a wavelength of 1550 nm on $r_3/r_2$ in a case where $\alpha$ is 2.1, similar to FIG. 15.

FIG. 17, similar to FIG. 15, is a diagram that illustrates the dependency of a DMD for a wavelength of 1550 nm on $r_3/r_2$ in a case where α is 2.1. As illustrated in FIG. 17, in a case where the DMD is −100 picoseconds/km or more and 100 picoseconds/km or less, the range of $r_3/r_2$ of a solid line is 1.25 or more and 1.29 or less on the whole, and the range of $r_3/r_2$ of a dashed line is 1.21 or more and 1.28 or less on the whole. Thus, also in a case where α is 2.1, an area sandwiched by the line at which the DMD is −100 picoseconds/km, the line at which the DMD is 100 picoseconds/km, the solid line, and the dashed line is present, and $r_2$ can be set within this area. Thus, also in this case, it can be understood that, by configuring the radiuses $r_2$ of the cores 11 and 21 of the core elements 10 and 20 adjacent to each other illustrated in FIG. 3 to have mutually-different values, the DMD of each of the cores 11 and 21 can be within the range described above.

Figure 18:
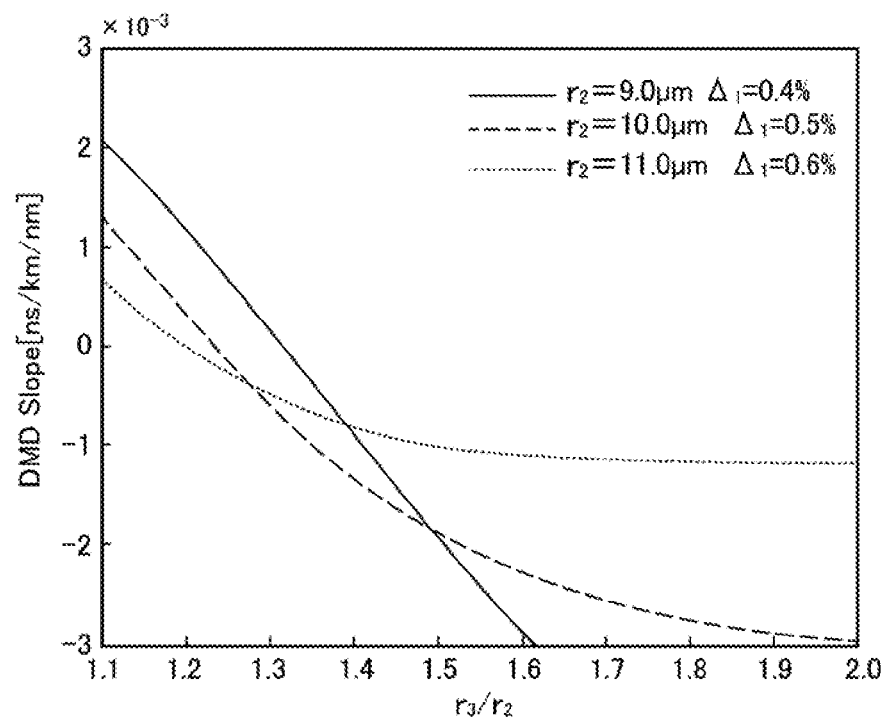
FIG. 18 is a diagram that illustrates the dependency of a DMD slope at a wavelength of 1550 nm on $r_3/r_2$, similar to FIG. 16, in a case where $\alpha$ is the same value as that illustrated in FIG. 17.

FIG. 18, similar to FIG. 16, is a diagram that illustrates the dependency of a DMD slope for a wavelength of 1550 nm on $r_3/r_2$ in a case where α is set to the same value as that illustrated in FIG. 17. In the range of a solid line of a case where the DMD is −100 picoseconds/km or more and 100 picoseconds/km or less and $r_3/r_2$ of a dashed line illustrated in FIG. 17, also in FIG. 18, an area sandwiched by the solid line and the dashed line is present, and it can be understood that the DMD slope is −0.4 picoseconds/km/nm or more and 4 picoseconds/km/nm or less on the whole in the area. Accordingly, also in a case where α is 2.1, in the area in which the DMD is −100 picoseconds/km or more and 100 picoseconds/km or less, in a case where the radiuses $r_2$ of the cores 11 and 21 are configured to have mutually-different values, it can be understood that the DMD slope also has a good value.

Figure 19:
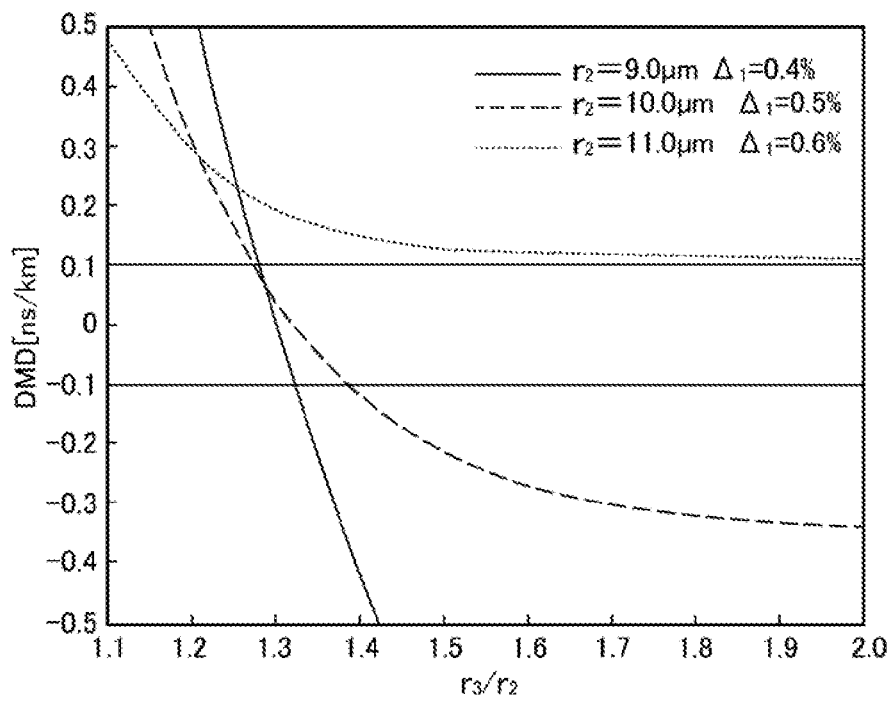
FIG. 19 is a diagram that illustrates the dependency of a DMD at a wavelength of 1550 nm on $r_3/r_2$, similar to FIG. 15, in a case where $\alpha$ is 2.2.

FIG. 19, similar to FIG. 15, is a diagram that illustrates the dependency of a DMD for a wavelength of 1550 nm on $r_3/r_2$ in a case where α is 2.2. As illustrated in FIG. 19, in a case where the DMD is −100 picoseconds/km or more and 100 picoseconds/km or less, the range of $r_3/r_2$ of a solid line is 1.27 or more and 1.32 or less on the whole, and the range of $r_3/r_2$ of the dashed line is 1.26 or more and 1.38 or less on the whole. Thus, also in a case where α is 2.2, an area sandwiched by the solid line and the dashed line in a state in which the DMD is −100 picoseconds/km or more and 100 picoseconds/km or less is present, and $r_2$ can be set within this area. Thus, also in this case, it can be understood that, by configuring the radiuses $r_2$ of the cores 11 and 21 of the core elements 10 and 20 adjacent to each other illustrated in FIG. 3 to have mutually-different values, the DMD of each of the cores 11 and 21 can be within the range described above.

Figure 20:
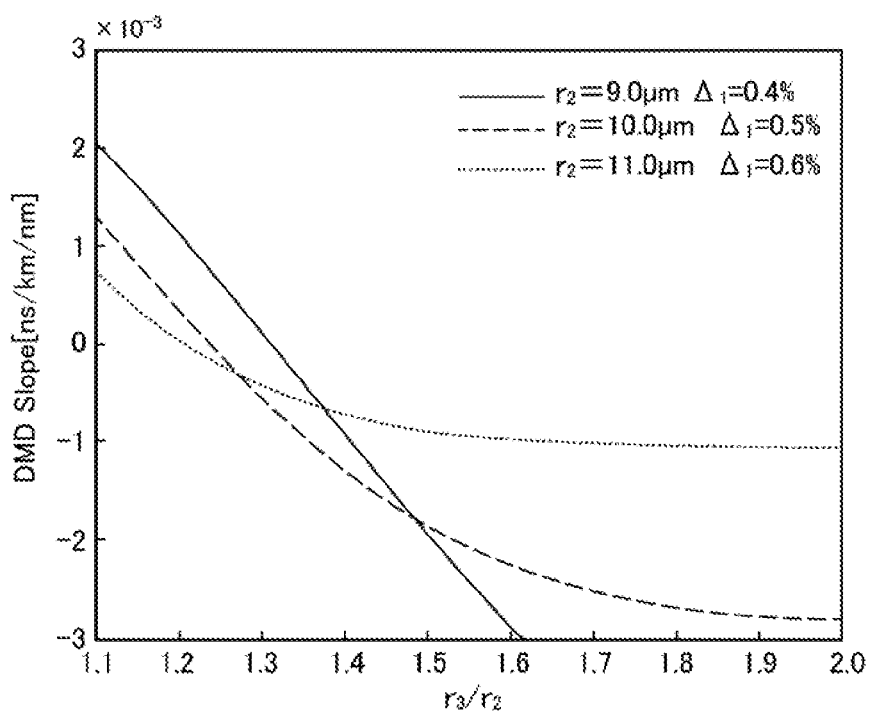
FIG. 20 is a diagram that illustrates the dependency of a DMD slope at a wavelength of 1550 nm on $r_3/r_2$, similar to FIG. 16, in a case where $\alpha$ is the same value as that illustrated in FIG. 19.

FIG. 20, similar to FIG. 16, is a diagram that illustrates the dependency of a DMD slope for a wavelength of 1550 nm on $r_3/r_2$ in a case where α is set to the same value as that illustrated in FIG. 19. In the range of a solid line of a case where the DMD is −100 picoseconds/km or more and 100 picoseconds/km or less and $r_3/r_2$ of a dashed line illustrated in FIG. 19, also in FIG. 20, an area sandwiched by the solid line and the dashed line is present, and it can be understood that the DMD slope is −1.2 picoseconds/km/nm or more and 0.3 picoseconds/km/nm or less on the whole in the area. Accordingly, also in a case where α is 2.2, in the area in which the DMD is −100 picoseconds/km or more and 100 picoseconds/km or less, in a case where the radiuses $r_2$ of the cores 11 and 21 are configured to have mutually-different values, it can be understood that the DMD slope also has a good value.

Figure 21:
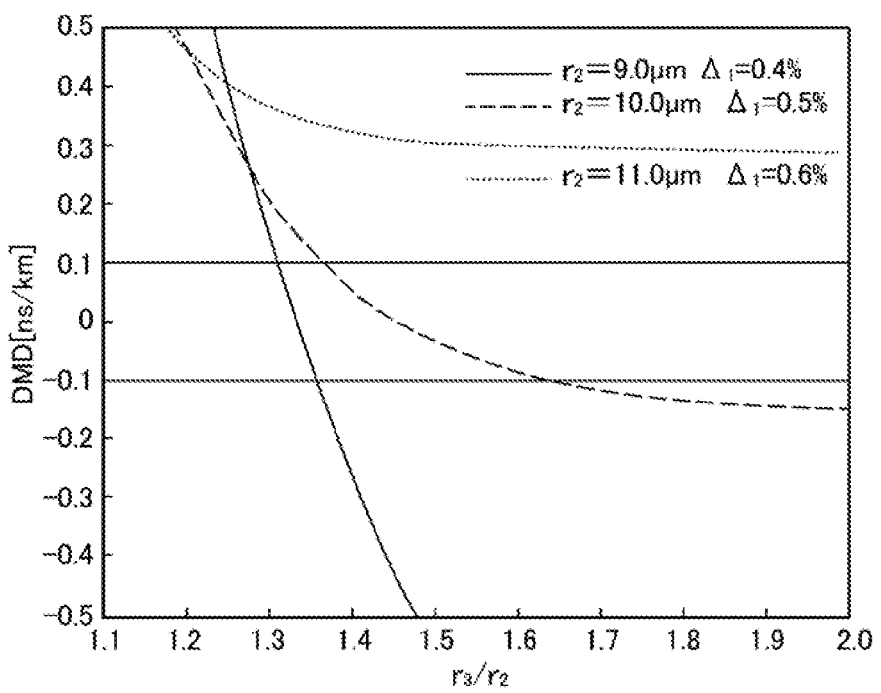
FIG. 21 is a diagram that illustrates the dependency of a DMD at a wavelength of 1550 nm on $r_3/r_2$, similar to FIG. 15, in a case where $\alpha$ is 2.3.

FIG. 21, similar to FIG. 15, is a diagram that illustrates the dependency of a DMD for a wavelength of 1550 nm on $r_3/r_2$ in a case where α is 2.3. As illustrated in FIG. 21, in a case where the DMD is −100 picoseconds/km or more and 100 picoseconds/km or less, the range of $r_3/r_2$ of a solid line is 1.30 or more and 1.35 or less on the whole, and the range of $r_3/r_2$ of the dashed line is 1.36 or more and 1.65 or less on the whole. Thus, also in a case where α is 2.2, an area sandwiched by the line at which the DMD is −100 picoseconds/km, the line at which the DMD is 100 picoseconds/km, the solid line, and the dashed line is present, and $r_2$ can be set within this area. Thus, also in this case, it can be understood that, by configuring the radiuses $r_2$ of the cores 11 and 21 of the core elements 10 and 20 adjacent to each other illustrated in FIG. 3 to have mutually-different values, the DMD of each of the cores 11 and 21 can be within the range described above.

Figure 22:
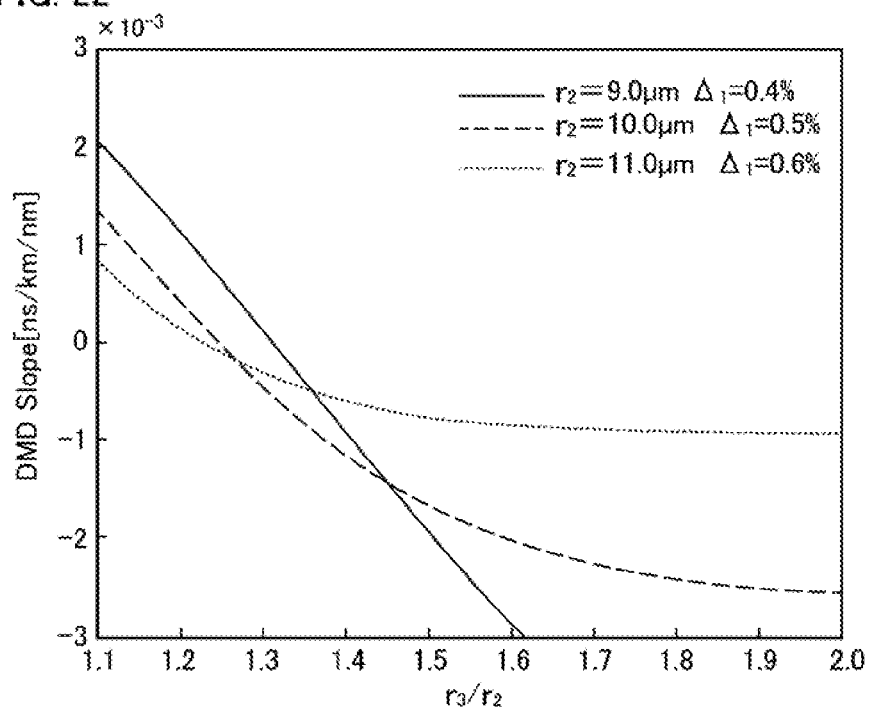
FIG. 22 is a diagram that illustrates the dependency of a DMD slope for a wavelength of 1550 nm on $r_3/r_2$ in a case where $\alpha$ is the same value as that illustrated in FIG. 21, similar to FIG. 16.

FIG. 22, similar to FIG. 16, is a diagram that illustrates the dependency of a DMD slope for a wavelength of 1550 nm on $r_1/r_2$ in a case where α is set to the same value as that illustrated in FIG. 21. In the range of a solid line of a case where the DMD is −100 picoseconds/km or more and 100 picoseconds/km or less and $r_3/r_2$ of a dashed line illustrated in FIG. 21, also in FIG. 22, an area sandwiched by the solid line and the dashed line is present, and it can be understood that the DMD slope is −2.1 picoseconds/km/nm or more and 0.2 picoseconds/km/nm or less on the whole in the area. Accordingly, in a case where α is 2.3, while there is an area in which a part of the DMD slope is degraded, in the area in which the DMD is −100 picoseconds/km or more and 100 picoseconds/km or less, in a case where the radiuses $r_2$ of the cores 11 and 21 are configured to have mutually-different values, it can be understood that the DMD slope also has a good value.

Next, in a case where α takes a value of 2.0 to 2.3 as described above, a DMD, a DMD slope, an effective refractive index $\Delta n_{eff}$ of a case where $r_3/r_2$ takes a specific value are illustrated in the following Table 6.

TABLE 6

| α | $r_3/r_2$ | $W/r_2$ | DMD [ps/km] | DMD Slope [ps/km/nm] | $\Delta n_{eff}$ |
|---|---|---|---|---|---|
| 2 | 1.22 | 1 | −120~+100 | +0.1~+1.0 | 0.001451 |
| 2.1 | 1.27 | 1 | −80~0 | −0.4~+0.4 | 0.001461 |
| 2.2 | 1.3 | 1 | −20~+20 | −0.5~+0.2 | 0.001472 |
| 2.3 | 1.36 | 1 | −100~+100 | −0.9~−0.5 | 0.00148 |

As illustrated in Table 6, in a case where α is 2.2, the DMD for a wavelength of 1550 nm can be configured to be in the range of −20 picoseconds/km to 20 picoseconds/km, and a good result of having the DMD slope in the range of −0.5 picoseconds/km/nm to 0.2 picoseconds/km/nm is acquired. In addition, in Table 6, a result of having the effective refractive index $\Delta n_{eff}$ to have a value larger than 0.0014 is acquired.

Next, the crosstalk between cores will be reviewed. An example of the parameters of the core elements 10 and 20 of a case where α represented in Table 6 described above is 2.2 is illustrated in the following Table 7.

TABLE 7

|  | $r_2$ [µm] | $\Delta_1$ [%] | $r_3/r_2$ | $W/r_2$ | α |
|---|---|---|---|---|---|
| Core Element 10 | 9.22 | 0.42 | 1.3 | 0.64 | 2.2 |
| Core Element 20 | 9.78 | 0.473 | 1.3 | 0.2 | 2.2 |

Figure 23:
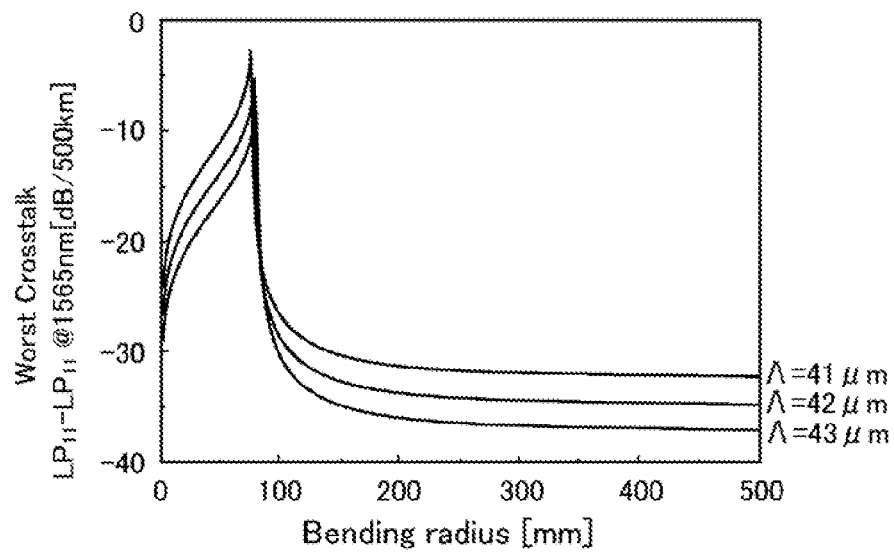
FIG. 23 is a diagram that illustrates a result of a calculation of a relation at a wavelength of 1565 nm between total crosstalk of a core element surrounded by four core elements and a bending diameter in a case where core elements illustrated Table 7 are arranged as those of the multi-core fiber illustrated in FIG. 3.

FIG. 23 is a diagram that illustrates a relation between crosstalk of each of the core 11 and 21 of the core elements 10 and 20 surrounded by four core elements and a bending diameter in a case where the core elements 10 and 20 illustrated Table 7 are arranged as those of the multi-core fiber 2 illustrated in FIG. 3. FIG. 23 illustrates crosstalk among light of the LP11 mode for a longest wavelength 1565 nm of the C+L band. As illustrated in FIG. 23, it has been understood that the magnitude of the crosstalk of the cores 11 and 21 adjacent to each other becomes a peak at a bending diameter smaller than a diameter of 100 mm. In addition, based on FIG. 23, also in a case where the core pitch is 41 µm, the crosstalk can be suppressed to −30 dB/100 km. This represents that a signal can be transmitted using 32 QAM with a strip length of 1000 km. In addition, based on FIG. 23, it can be understood that the crosstalk can be configured to be −35 dB/100 km or less in a case where the core pitch is 43 µm.

Figure 24:
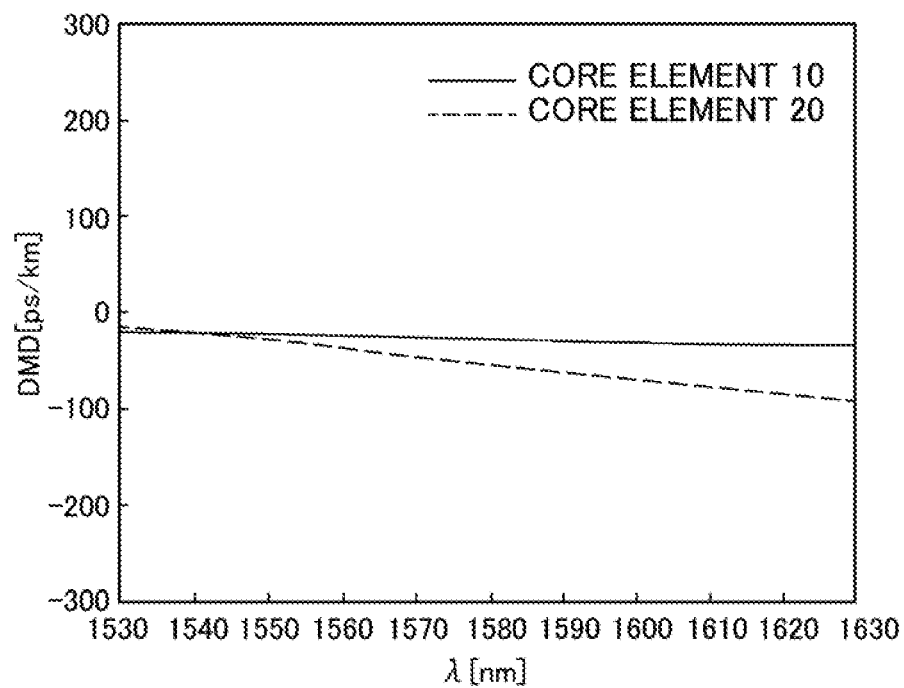
FIG. 24 is a diagram that illustrates the wavelength dependency of the DMD of each core element illustrated in Table 7.

FIG. 24 is a diagram that illustrates wavelength dependency of the DMD of each of the cores 11 and 21 of the core elements 10 and 20 illustrated in Table 7. As illustrated in FIG. 24, in case of the core elements 10 and 20 illustrated in Table 7, in the C band and the L band, it can be understood that the absolute value of the DMD can be configured to be 50 picoseconds/km or less.

Figure 25:
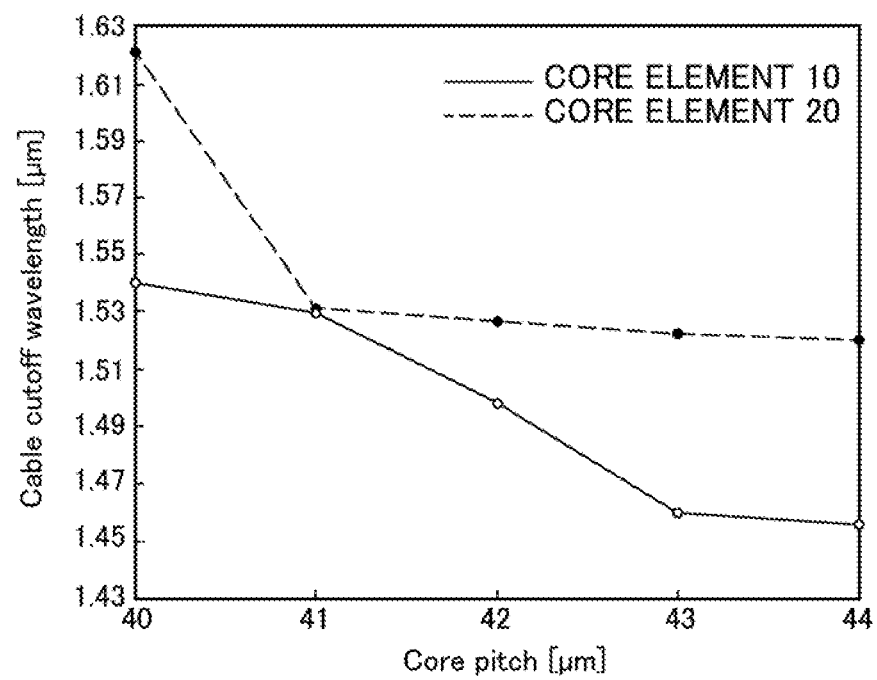
FIG. 25 is a diagram that illustrates a relation between the cutoff wavelength of each core element surrounded by four core elements and an core pitch in a case where the core elements illustrated in Table 7 are arranged as those of the multi-core fiber illustrated in FIG. 3.

Next, the cutoff wavelength will be reviewed. FIG. 25 is a diagram that illustrates a result of a calculation of a relation between the cutoff wavelength of the LP 21 mode of each of the cores 11 and 21 of the core elements 10 and 20 surrounded by four core elements and an core pitch using a finite element method in a case where the core elements 10 and 20 illustrated in Table 7 are arranged as those of the multi-core fiber 2 illustrated in FIG. 3. As illustrated in FIG. 25, it can be understood that, in a case where the core pitch is 41 mm or more, the cutoff wavelength of each of the core elements 10 and 20 can be configured to be less than 1530 nm that does not fall into the C band.

Next, a distance (cladding thickness) between the outer circumferential face of the outer cladding 30 and each of the core elements 10 and 20 will be reviewed. An example of the parameters of the core elements 10 and 20 of a case where a illustrated in Table 6 described above is 2.2 is illustrated in the following Table 8.

TABLE 8

|  | $r_2$ [μm] | $\Delta_1$ [%] | $r_3/r_2$ | $W/r_2$ | $\alpha$ |
|---|---|---|---|---|---|
| Core Element 10 | 9.39 | 0.436 | 1.27 | 0.6 | 2.2 |
| Core Element 20 | 9.83 | 0.478 | 1.27 | 0.2 | 2.2 |

Figure 26:
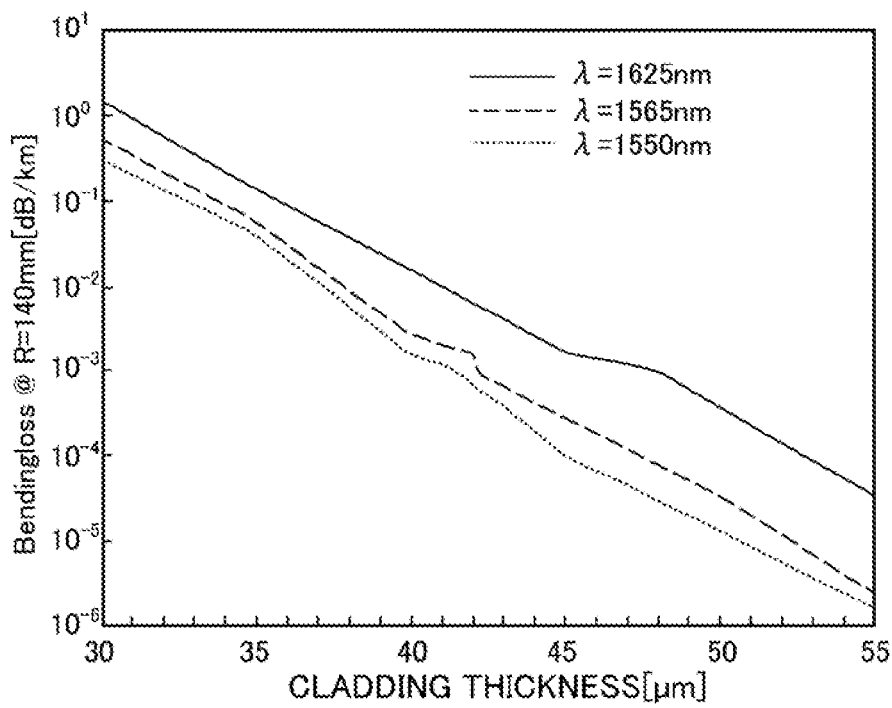
FIG. 26 is a diagram that illustrates a relation between a bending loss of light of the LP11 mode propagating through a core element 10 illustrated in Table 8 and a cladding thickness.
Figure 27:
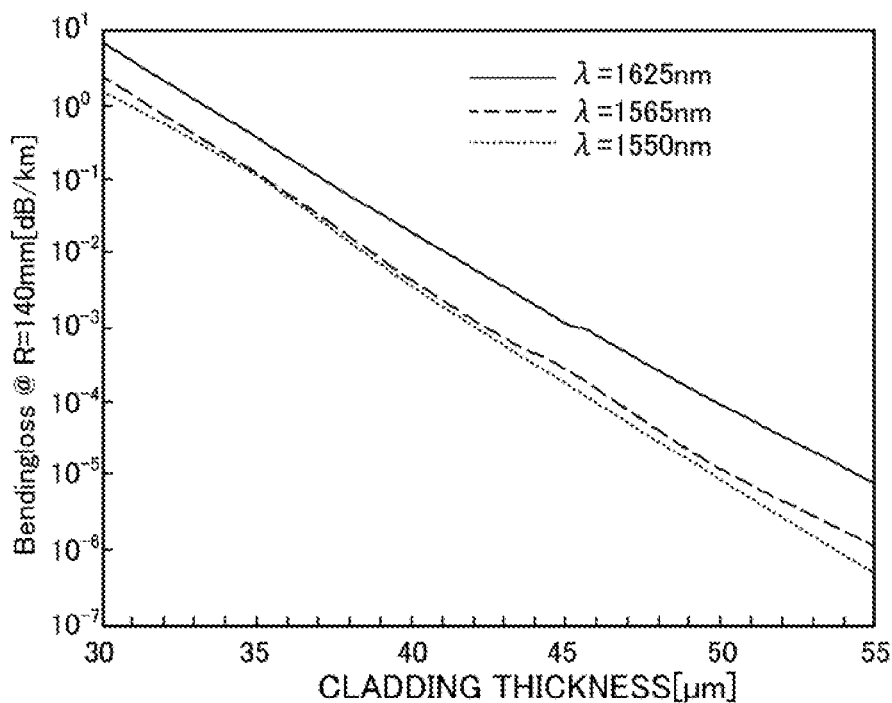
FIG. 27 is a diagram that illustrates a relation between a bending loss of light of the LP11 mode propagating through a core element 20 illustrated in Table 8 and a cladding thickness.

FIG. 26 is a diagram that illustrates a relation between a bending loss of light of the LP11 mode propagating through the core 11 illustrated in Table 8 and a cladding thickness, and FIG. 27 is a diagram that illustrates a relation between a bending loss of light of the LP11 mode propagating through the core 21 illustrated in Table 8 and a cladding thickness. In the cases illustrated in FIGS. 26 and 27, the bending radius is configured to be 140 mm. In FIGS. 26 and 27, a solid line represents light having a wavelength of 1625 nm, a dashed line represents light having a wavelength of 1565 nm, and a dotter line represents light having a wavelength of 1550 nm. As illustrated in FIGS. 26 and 27, it can be understood that, in a case where the cladding thickness is 47 μm or more, the bending loss of each of the cores 11 and 21 is 0.001 dB/km or less.

<Production of Multi-Core Fiber>

Based on the description presented above, a multi-core fiber 2 illustrated in FIG. 3 in which core elements 10 and 20 having refractive index profiles illustrated in FIG. 4 was produced. The outer diameter of the outer cladding, the outer diameter of the outer protective layer and the core pitch of the produced multi-core fiber 2 were as illustrated in Table 9. An upper winding and a lower winding represent both ends of a fiber wound around a bobbin. There is no big difference between the dimensions of the upper winding and the lower winding, and accordingly, it can be understood that a fiber that is uniform in the longitudinal direction can be acquired.

TABLE 9

|  |  | Lower Winding | Upper Winding |
|---|---|---|---|
| Outer Diameter of Outer Cladding [μm] | Maximum | 230.4 | 230.1 |
|  | Minimum | 229.5 | 229 |
| Outer Diameter of Outer Protective Layer [μm] |  | 339.7 | 341.8 |
| Core Pitch [μm] | Average | 43.1 | 42.9 |
|  | Maximum | 43.4 | 43.2 |
|  | Minimum | 42.8 | 42.8 |
|  | Standard Deviation | 0.21 | 0.17 |

Next, for each core element of the produced multi-core fiber 2, a loss of propagating light of the LP01 mode, a differential mode group delay DMD between light of the LP01 mode and light of the LP11 mode, crosstalk of the light of the LP11 mode at 500 km, a polarization mode dispersion PMD of the light of the LP01 mode, a polarization-dependent loss PDL of the light of the LP01 mode, an effective area of the light of the LP01 mode, and a cutoff wavelength of light of the LP21 mode were measured. A result thereof is illustrated in the following Table 10. In Table 10, the meanings of cores A to L are the same as those of the cores A to L illustrated in Table 4.

TABLE 10

| Item | Transmission Loss [dB/km] | | DMD [ps/km] | | 500 km-Total XT [dB] | | PMD [ps/km$^{1/2}$] | PDL [dB] | $A_{eff}$ [μm$^2$] | | $\lambda_c$ [μm] |
|---|---|---|---|---|---|---|---|---|---|---|---|
| Mode | $LP_{01}$ | | $LP_{01}$-$LP_{11}$ | | $LP_{11}$ | | $LP_{01}$ | $LP_{01}$ | $LP_{01}$ | | $LP_{21}$ |
| Wavelength [nm] | 1550 | 1625 | 1530 | 1565 | 1550 | 1565 | 1530~1625 | 1530~1625 | 1550 | 1625 | — |
| Core A | 0.219 | 0.22 | 23 | 35 | −54.1 | −53.3 | 0.28 | 0.59 | 110 | 116 | 1.49 |
| Core B | 0.217 | 0.224 | 27 | 51 | −60 | −57.3 | 1.5 | 0.33 | 111 | 117 | 1.41 |
| Core C | 0.218 | 0.22 | −34 | −9 | −51.4 | −53.9 | 0.19 | 0.68 | 111 | 118 | 1.51 |
| Core D | 0.217 | 0.223 | 2 | 31 | −58.2 | −61 | 0.41 | 0.71 | 108 | 114 | 1.39 |
| Core E | 0.22 | 0.221 | 11 | 23 | −54.2 | −57.6 | 0.29 | 0.69 | 109 | 117 | 1.49 |
| Core F | 0.216 | 0.222 | 47 | 62 | −48.4 | −51.6 | 0.21 | 0.27 | 109 | 115 | 1.4 |
| Core G | 0.219 | 0.22 | −33 | −11 | −54.8 | −59 | 0.78 | 0.8 | 108 | 113 | 1.5 |
| Core H | 0.221 | 0.223 | −6 | 24 | −56.1 | −59.9 | 0.44 | 0.98 | 109 | 114 | 1.4 |
| Core I | 0.219 | 0.221 | 4 | 18 | −50 | −51.7 | 0.11 | 0.28 | 110 | 116 | 1.52 |
| Core J | 0.217 | 0.224 | −6 | 23 | −52.3 | −52.1 | 0.7 | 0.17 | 108 | 115 | 1.37 |
| Core K | 0.218 | 0.22 | −41 | −15 | −53.2 | −52.8 | 1 | 0.28 | 111 | 116 | 1.49 |
| Core L | 0.218 | 0.224 | 12 | 43 | −51.1 | −51.5 | 0.15 | 0.5 | 110 | 116 | 1.39 |
| Average | 0.218 | 0.221 | 20 | 29 | −63.4 | −64.9 | 0.5 | 0.52 | 110 | 116 | 1.45 |
| Maximum | 0.221 | 0.224 | 47 | 62 | −58.2 | −61.3 | 1.5 | 0.98 | 111 | 118 | 1.52 |
| Minimum | 0.216 | 0.22 | 2 | 9 | −69.7 | −70.7 | 0.11 | 0.17 | 108 | 113 | 1.37 |

As illustrated in Table 10, the produced multi-core fiber 2 propagates light of the LP01 mode and the LP11 mode on the whole in the C band and the L band, and results of the suppression of the crosstalk and a decrease in the differential mode group delay are acquired.

As above, according to the present invention, it has been understood that, in a multi-mode multi-core fiber, crosstalk is decreased, and the differential mode group delay is decreased, and the load of the signal processing on the reception side of light can be decreased.

A multi-core fiber according to the present invention is capable of decreasing the load of signal processing on the reception side of light and can be used in the field of optical communication.

REFERENCE SIGNS LIST 1, 2 . . . multi-core fiber
10, 20 . . . core element
11, 21 . . . core
11a, 21a . . . inner area
11b, 21b . . . outer area
12, 22 . . . inner cladding layer
13, 23 . . . trench layer
30 . . . outer cladding
41 . . . inner protective layer
42 . . . outer protective layer

The invention claimed is:

1. A multi-core fiber comprising:
nine or more core elements each including a core that propagates light of at least up to a second-order LP mode in a C band and an L band, an inner cladding layer that surrounds an outer circumferential face of the core and has a refractive index lower than a refractive index of the core, and a trench layer that surrounds an outer circumferential face of the inner cladding layer and has a refractive index lower than the refractive index of the inner cladding layer; and
an outer cladding that surrounds outer circumferential faces of the trench layers and has a refractive index higher than the refractive index of the trench layer and lower than the refractive index of the core,
wherein effective refractive indices of light propagating through cores adjacent to each other are different from each other such that a magnitude of crosstalk of light of a highest-order LP mode commonly propagating through the cores adjacent to each other between the cores adjacent to each other becomes a peak at a bending diameter smaller than a diameter of 100 mm, and
wherein the core has a higher refractive index in an area including a center axis than in an area disposed on an outer circumferential side such that a differential mode group delay of the core is 700 picoseconds/km or less.

2. The multi-core fiber according to claim 1, wherein an outer diameter of the outer cladding is 125 μm or more and 230 μm or less.

3. The multi-core fiber according to claim 1, wherein a difference between effective areas of light of a same LP mode propagating through the cores is 20 μm² or less.

4. The multi-core fiber according to claim 1, wherein a bending loss of light of a highest-order LP mode of light having a longest wavelength propagating through each of the cores is 0.5 dB or less in a case where the cores are rolled 100 turns with a diameter of 60 mm.

5. The multi-core fiber according to claim 1, wherein the magnitude of the crosstalk of the light of the highest-order LP mode commonly propagating through the cores adjacent to each other between the cores adjacent to each other is −30 dB/100 km or less.

6. The multi-core fiber according to claim 1,
wherein the core includes an inner area that includes a center axis and an outer area that surrounds an outer circumferential face of the inner area without any gap and is surrounded by the inner cladding layer without any gap, and
wherein a refractive index of the inner area is higher than a refractive index of the outer area.

7. The multi-core fiber according to claim 1, wherein the refractive index of the core decreases from a center axis toward an outer circumferential side, and a change rate of the refractive index increases toward the outer circumferential side.

8. The multi-core fiber according to claim 1, wherein the cores are arranged in an annular shape.

9. The multi-core fiber according to claim 8,
wherein the number of the cores is even, and
wherein the two types of the cores having mutually-different effective refractive indices of the propagating light are arranged to be adjacent to each other.

10. The multi-core fiber according to claim 1, wherein the cores are arranged in a square lattice shape.

11. The multi-core fiber according to claim 10,
wherein the number of the core elements is 12, and
wherein the cores are respectively arranged on lattice points of a predetermined tetragonal lattice and lattice points of a tetragonal lattice adjacent to the predetermined tetragonal lattice.

12. The multi-core fiber according to claim 10, wherein the two types of the cores having mutually-different effective refractive indices of propagating light are arranged to be adjacent to each other.

13. The multi-core fiber according to claim 1, wherein a wavelength band of light propagating through the cores is a C band.

14. The multi-core fiber according to claim 1,
wherein an outer diameter of the outer cladding is 125 μm or more and 230 μm or less,
wherein the refractive index of the core decreases from a center axis toward an outer circumferential side, and a change rate of the refractive index increases toward the outer circumferential side,
wherein a difference between effective areas of light of a same LP mode propagating through the cores is 10 μm² or less,
wherein a cutoff wavelength of light of an LP21 mode of each of the cores is 1530 nm or less,
wherein a bending loss of light of the highest-order LP mode of light having a longest wavelength propagating through each of the cores is 0.5 dB or less in a case where each of the cores is rolled 100 turns with a diameter of 60 mm,
wherein a differential mode group delay of the cores is 100 picoseconds/km or less, and
wherein the magnitude of the crosstalk of light of the highest-order LP mode commonly propagating through the cores adjacent to each other between the cores adjacent to each other is −30 dB/100 km or less.

15. The multi-core fiber according to claim 14,
wherein the number of the core elements is 12, and the core elements are arranged in a tetragonal lattice shape, and wherein the cores are respectively arranged on lattice points of a predetermined tetragonal lattice and lattice points of a tetragonal lattice adjacent to the predetermined tetragonal lattice.

* * * * *